(12) United States Patent
Zhang et al.

(10) Patent No.: US 11,900,187 B1
(45) Date of Patent: Feb. 13, 2024

(54) AUTOMATIC TUNING COMPENSATION MECHANISM

(71) Applicants: Ziling Zhang, Boulder, CO (US); Farnaz Hajiahmadi Foomani, Milwaukee, WI (US); Mikel Stanich, Boulder, CO (US)

(72) Inventors: Ziling Zhang, Boulder, CO (US); Farnaz Hajiahmadi Foomani, Milwaukee, WI (US); Mikel Stanich, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/177,243

(22) Filed: Mar. 2, 2023

(51) Int. Cl.
*G06K 15/02* (2006.01)
*G06K 15/00* (2006.01)
*B41J 2/21* (2006.01)

(52) U.S. Cl.
CPC .......... *G06K 15/027* (2013.01); *B41J 2/2132* (2013.01); *G06K 15/1881* (2013.01); *G06K 15/408* (2013.01)

(58) Field of Classification Search
CPC ............. G06K 15/027; G06K 15/1881; G06K 15/408; B41J 2/2132
See application file for complete search history.

(56) References Cited

U.S. PATENT DOCUMENTS

| 6,270,187 B1 | 8/2001 | Murcia et al. |
| 7,024,126 B2 | 4/2006 | Kellie et al. |
| 7,085,002 B2 | 8/2006 | Ilbery et al. |

(Continued)

FOREIGN PATENT DOCUMENTS

| CN | 107709015 | 2/2018 |
| CN | 110871626 | 3/2020 |

(Continued)

OTHER PUBLICATIONS

Jin, Y. A., He, Y., Gao, Q., Fu, J. Z., & Fu, G. Q. (2014). Droplet deviation modeling and compensation scheme of inkjet printing. The International Journal of Advanced Manufacturing Technology, 75(9-12), 1405-1415. See highlighted sections.

(Continued)

*Primary Examiner* — Juan M Guillermety
(74) *Attorney, Agent, or Firm* — Jaffery Watson; Mendonsa & Hamilton LLP

(57) ABSTRACT

A printing system is disclosed. The printing system includes at least one physical memory device to store compensation logic and one or more processors coupled with the at least one physical memory device to execute the compensation logic to receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements, associate measurement data values with the gap adjacent pel forming elements, the applied compensation halftone design and the plurality of tint levels and determine optimal compensation by selecting the compensation halftone design that has corresponding measurement data values closest to compensation target values for each of the plurality of tint levels.

20 Claims, 18 Drawing Sheets

(56) References Cited

U.S. PATENT DOCUMENTS

| | | | |
|---|---|---|---|
| 7,289,248 B2 | 10/2007 | Yamazaki | |
| 7,306,312 B2 | 12/2007 | Chiwata | |
| 7,483,171 B2 | 1/2009 | Agar | |
| 7,538,909 B2 | 5/2009 | Ilbery et al. | |
| 7,585,038 B2 | 9/2009 | Shibata et al. | |
| 8,033,630 B2 | 10/2011 | Miyamoto | |
| 8,157,345 B2 | 4/2012 | Sasyama | |
| 8,262,190 B2 | 9/2012 | Mizes et al. | |
| 8,322,811 B2 | 12/2012 | Chandu et al. | |
| 8,511,788 B2 | 8/2013 | Inoue | |
| 8,542,418 B2 | 9/2013 | Chandu | |
| 8,573,731 B2 | 11/2013 | Bastani et al. | |
| 8,699,103 B2 | 4/2014 | Mestha et al. | |
| 8,807,684 B2 | 8/2014 | Allworth et al. | |
| 8,967,757 B2 | 3/2015 | Bastani et al. | |
| 9,108,402 B2 | 8/2015 | Sudo | |
| 9,218,645 B2 | 12/2015 | Shibata | |
| 9,302,469 B2 | 4/2016 | De Grijs | |
| 9,463,638 B1 | 10/2016 | Kroon | |
| 9,573,382 B1 | 2/2017 | Metcalfe | |
| 9,621,762 B2 | 4/2017 | Chandu et al. | |
| 9,661,154 B1 | 5/2017 | Stanich et al. | |
| 9,738,066 B1 | 8/2017 | Kroon | |
| 9,914,309 B2 | 3/2018 | Billow et al. | |
| 10,082,990 B2 | 9/2018 | Martin et al. | |
| 10,105,948 B2 | 10/2018 | Ueshima | |
| 10,214,038 B2 | 2/2019 | Klinger et al. | |
| 10,442,211 B2 | 10/2019 | Stanich | |
| 10,449,759 B2 | 10/2019 | Trachanas et al. | |
| 10,488,846 B2 | 11/2019 | Donovan | |
| 10,538,106 B2 | 1/2020 | Stritzel | |
| 10,696,062 B2 | 6/2020 | Hauck et al. | |
| 10,953,665 B2 | 3/2021 | Billow | |
| 11,184,504 B2 | 11/2021 | Stanich et al. | |
| 11,216,710 B1 | 1/2022 | Stanich | |
| 11,270,171 B2 | 3/2022 | Fukui | |
| 11,281,950 B2 | 3/2022 | Otani | |
| 11,318,753 B2 | 5/2022 | Kikuchi | |
| 11,338,591 B1 * | 5/2022 | Kailey | B41J 2/2139 |
| 11,368,592 B1 * | 6/2022 | Kailey | G06K 15/102 |
| 11,443,152 B1 | 9/2022 | Stanich | |
| 11,630,975 B1 | 4/2023 | Terrab | |
| 11,632,487 B1 | 4/2023 | Terrab | |
| 11,636,296 B1 | 4/2023 | Stanich | |
| 11,637,946 B2 | 4/2023 | Stanich | |
| 2002/0051144 A1 | 5/2002 | Ilbery et al. | |
| 2005/0099446 A1 | 5/2005 | Mizes et al. | |
| 2005/0243340 A1 | 11/2005 | Tai et al. | |
| 2006/0061782 A1 | 3/2006 | Yao | |
| 2006/0072160 A1 | 4/2006 | Yamazaki | |
| 2007/0115507 A1 | 5/2007 | Terekhov et al. | |
| 2009/0284762 A1 | 11/2009 | Zhang et al. | |
| 2010/0207983 A1 | 8/2010 | Hiroyuki | |
| 2012/0050755 A1 | 3/2012 | Chandu | |
| 2013/0021400 A1 | 1/2013 | Tamagawa | |
| 2013/0076825 A1 | 3/2013 | Szafraniec | |
| 2013/0176600 A1 | 7/2013 | Chandu | |
| 2013/0293611 A1 | 11/2013 | Ueshima | |
| 2014/0022601 A1 | 1/2014 | Okubo | |
| 2014/0071191 A1 | 3/2014 | Masashi | |
| 2014/0313255 A1 | 10/2014 | Ukishima | |
| 2015/0062233 A1 | 3/2015 | Ueshima | |
| 2016/0052318 A1 | 2/2016 | Humet Pous | |
| 2016/0100079 A1 | 4/2016 | Gerrits | |
| 2016/0309056 A1 | 10/2016 | Wakui | |
| 2017/0236041 A1 | 8/2017 | Stanich | |
| 2017/0280022 A1 | 9/2017 | Kuriowa | |
| 2018/0008995 A1 | 1/2018 | Baker et al. | |
| 2018/0022131 A1 | 1/2018 | Klinger et al. | |
| 2018/0234582 A1 | 8/2018 | Stanich et al. | |
| 2018/0236776 A1 | 8/2018 | Stanich et al. | |
| 2019/0389227 A1 | 12/2019 | Stanich et al. | |
| 2020/0094546 A1 | 3/2020 | Samadzadegan | |
| 2020/0108632 A1 | 4/2020 | Billow | |
| 2020/0247137 A1 | 8/2020 | Ryosuke et al. | |
| 2020/0274991 A1 * | 8/2020 | Stanich | H04N 1/4055 |
| 2021/0271431 A1 | 9/2021 | Stanich | |
| 2021/0339522 A1 | 11/2021 | Shibata | |
| 2022/0086826 A1 | 3/2022 | Stanich | |
| 2022/0286578 A1 | 9/2022 | Stanich | |
| 2022/0286581 A1 * | 9/2022 | Kailey | B41J 2/2146 |
| 2023/0120258 A1 | 4/2023 | Stanich | |
| 2023/0123461 A1 | 4/2023 | Stanich | |

FOREIGN PATENT DOCUMENTS

| | | |
|---|---|---|
| EP | 1197916 A2 | 4/2002 |
| EP | 1157840 B1 | 7/2007 |
| JP | 4604614 B2 | 1/2011 |
| JP | 2018133801 | 8/2018 |
| JP | 2018167492 | 11/2018 |
| WO | 2008059264 A1 | 5/2008 |

OTHER PUBLICATIONS

Notice of Allowance for U.S. Appl. No. 17/684,275, dated Feb. 1, 2023, 8 pages.

Office Action for U.S. Appl. No. 17/684,275, dated Dec. 8, 2022, 16 pages.

Hansen et al., "High-Throughput Printing via Microvascular Multinozzle Arrays", Advanced Materials, 25(1), pp. 96-102.

Vantram, S. R. (2014). Fully Automated Calibration Procedure to Compensate Print Non-uniformities Incurred in Fixed Print-head Array Structures. Retrieved from https://jp.ricoh.com/-/Media/Ricoh/Sites/jp_ricoh/technology/techreport/39/pdf/RTR39a18.pdf See highlighted sections.

Extended European Search Report for EP21191026.0, 11 pages, dated Jan. 5, 2022.

International Search Report and Written Opinion for PCT/JP2022/009086, dated Jun. 2, 2022, 12 pages.

International Search Report and Written Opinion for PCT/JP2022/008654, dated Jun. 17, 2022, 15 pages.

Extended European Search Report for EP22159749, dated Jul. 19, 2022, 8 pages.

Notice of Allowance for U.S. Appl. No. 17/684,270, dated Jul. 11, 2023, 13 pages.

Office Action for U.S. Appl. No. 17/684,266, dated Jul. 5, 2023, 15 pages.

* cited by examiner mult_array(:,:,1) =

254 230 90 16 2 25 82 222
247 214 132 41 8 58 156 189
99 146 181 140 74 123 173 107
33 66 165 206 239 197 115 49
2 25 82 222 255 230 90 16
8 58 156 189 247 214 132 41
74 123 173 107 99 146 181 140
239 197 115 49 33 66 165 206 mult_array(:,:,2) =

252 228 88 14 1 22 80 219
244 211 129 38 5 55 154 186
96 145 178 137 71 121 170 104
30 63 162 203 236 195 112 47
1 22 80 219 252 228 88 14
5 55 154 186 244 211 129 38
71 121 170 104 96 145 178 137
236 195 112 47 30 63 162 203 mult_array(:,:,3) =

250 226 85 11 0 19 77 217
241 208 126 36 3 52 151 184
93 143 175 134 69 118 167 101
27 60 159 200 233 192 110 44
0 19 77 217 250 225 85 11
3 52 151 184 241 208 126 36
69 118 167 101 93 143 175 134
233 192 110 44 27 60 159 200

AUTOMATIC TUNING COMPENSATION MECHANISM

FIELD OF THE INVENTION

The invention relates to the field of image reproduction, and in particular, to uniformity compensation.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium. Inaccurate physical gaps between adjacent printheads may cause visible print artifacts.

SUMMARY

In one embodiment, a printing system is disclosed. The printing system includes at least one physical memory device to store compensation logic and one or more processors coupled with the at least one physical memory device to receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements, associate measurement data values with the gap adjacent pel forming elements, the applied compensation halftone design and the plurality of tint levels and determine optimal compensation by selecting the compensation halftone design that has corresponding measurement data values closest to compensation target values for each of the plurality of tint levels.

BRIEF DESCRIPTION OF THE DRAWINGS

A better understanding of the present invention can be obtained from the following detailed description in conjunction with the following drawings, in which.

DETAILED DESCRIPTION

Prior to commencing printing operations at a production printing system compensation may be performed to compensate for measured response differences for printhead nozzles in the vicinity of the gap between two adjacent printheads. Typically, compensation is required when the distance between the nozzles on each side of the printhead gap region is not the ideal. Compensation methods are based on uniformity compensation of nozzles. However, variations in the separation distance between adjacent nozzles in the printhead gap region may lead to undesired artifacts in printed output such as voids or banding (e.g., light or dark streaks). For example, the appearance of the artifact may be affected by the distance between adjacent printheads caused by the gap between the nozzles in adjacent printheads that does not have the ideal spacing (e.g., 1/DPI). Where DPI is ideal nozzle frequency measured in dots per inch.

Current uniformity compensation relies on finding optimal printhead gap compensation strength, which requires prior knowledge of ink spread, printhead gap, and ink model simulation, or time-consuming manual tuning performed by printer operators.

According to one embodiment, a mechanism to perform printhead gap compensation is described. A mechanism to perform automatic tuning for printhead gap compensation is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
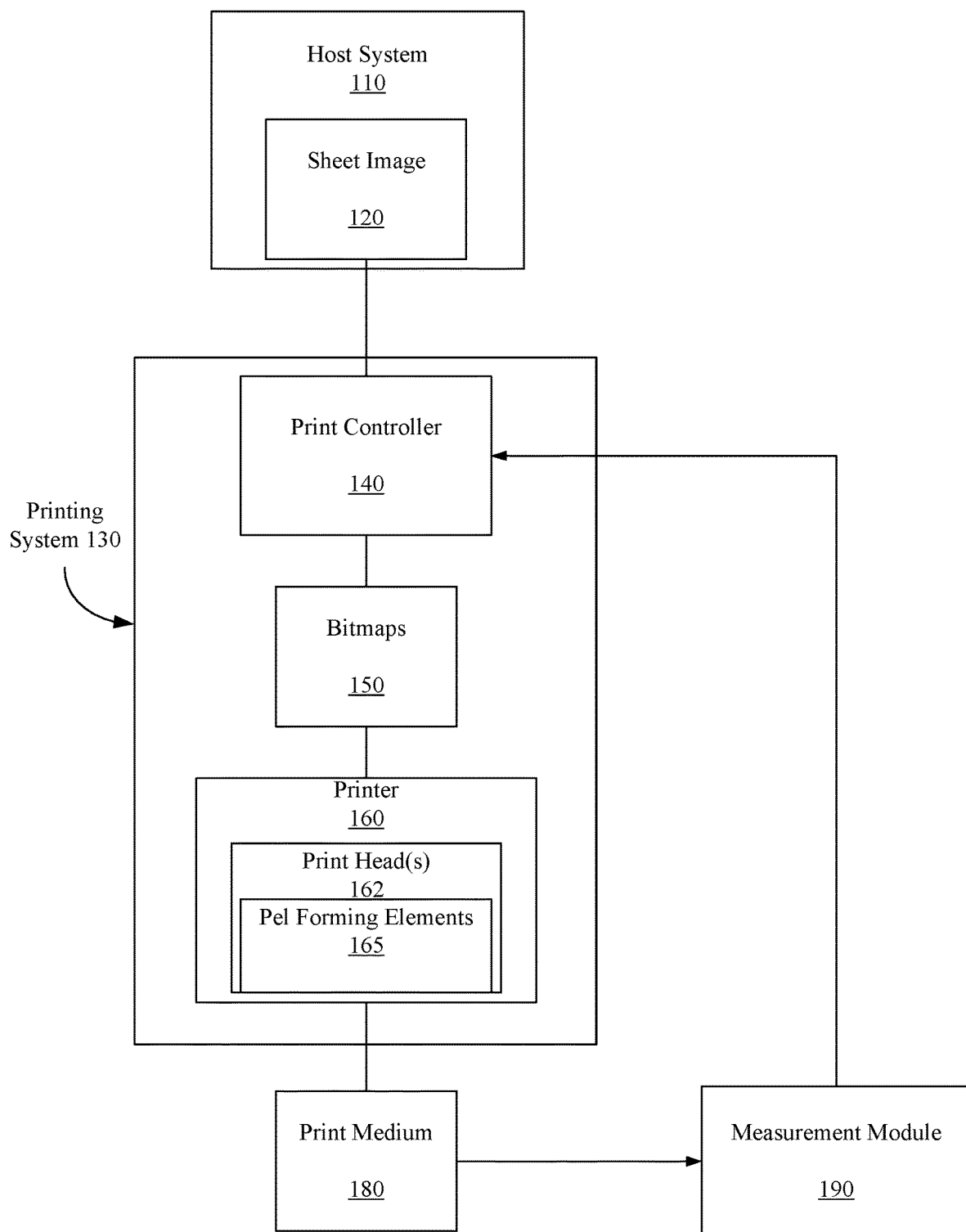
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more print heads 162, each including one or more pel forming elements 165 that directly or indirectly (e.g., by transfer of marking material through an intermediary) forms the representation of picture elements (pels) on the print medium 180 with marking material applied to the print medium. The printhead gap is the region between two adjacent print heads 162 where the printing transitions between pel forming elements 165 from one print head to the pel forming elements 165 in another printhead. Typically, this printhead gap is between adjacent printheads 162 and adjacent pel forming elements 165 in their respective printheads. The separation distance between the adjacent pel forming elements in the printhead gap region may not be ideal due to the use of different printheads.

In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser). The pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. The pel forming elements 165 may be assigned to one of one or more color planes that correspond to types of marking materials (e.g., Cyan, Magenta, Yellow, and blacK (CMYK)).

In a further embodiment, printer 160 is a multi-pass printer (e.g., dual pass, 3 pass, 4 pass, etc.) wherein multiple sets of pel forming elements 165 print the same region of the print image on print medium 180. In the case of multi-pass printing, additional printhead gaps may be present due to multiple sets of pel forming elements 165. Each individual gap may require compensation for each set of printheads in the multi-pass printer. The set of pel forming elements 165 may be located on the same physical structure (e.g., an array of nozzles on an ink jet print head 162) or separate physical structures. The resulting print medium 180 may be printed in color and/or in any of a number of gray shades, including black and white (e.g., Cyan, Magenta, Yellow, and blacK, (CMYK)). The host system 110 may include any computing device, such as a personal computer, a server, or even a digital imaging device, such as a digital camera or a scanner.

The sheet image 120 may be any file or data that describes how an image on a sheet of print medium 180 should be printed. For example, sheet image 120 may include PostScript data, Printer Command Language (PCL) data, and/or any other printer language data. The print controller 140 processes the sheet image to generate a bitmap 150 for transmission. The bitmap 150 includes the instructions (e.g., instructed ink drop size and/or instructed pel forming element location) for one or more printheads 162 and pel forming elements 165. Bitmap 150 may be a halftoned bitmap (e.g., a compensated halftone bit map generated from compensated halftones, or uncompensated halftone bit map generated from uncompensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be a sensor to take measurements of printed images on print medium 180. Measurement module 190 may generate and transmit measurement data 222. Measurement data 222 may be OD (e.g., optical density), perceptual lightness (e.g., L* in the CIELAB color plane L*a*b*) and/or scanned image (e.g., RGB) data corresponding to a printed image. In one embodiment, measurement module 190 may comprise one or more sensors that each or in total take measurements for printed markings produced for some or all pel forming elements 165. In another embodiment, measurement module 190 may be a camera system, in-line scanner, densitometer or spectrophotometer.

In a further embodiment, measurement data 222 may include map information to correlate portions of the measurement data to the corresponding pel forming elements 165 that contributed to the printing of the portions of the measurement data. In another embodiment, the print instructions for a test chart (e.g., step chart or test master) along with the known printer design provides the correlation of the portions of the measurement data to the corresponding pel forming elements that contributed to the printing of the portions of the measurement data.

Figure 2:
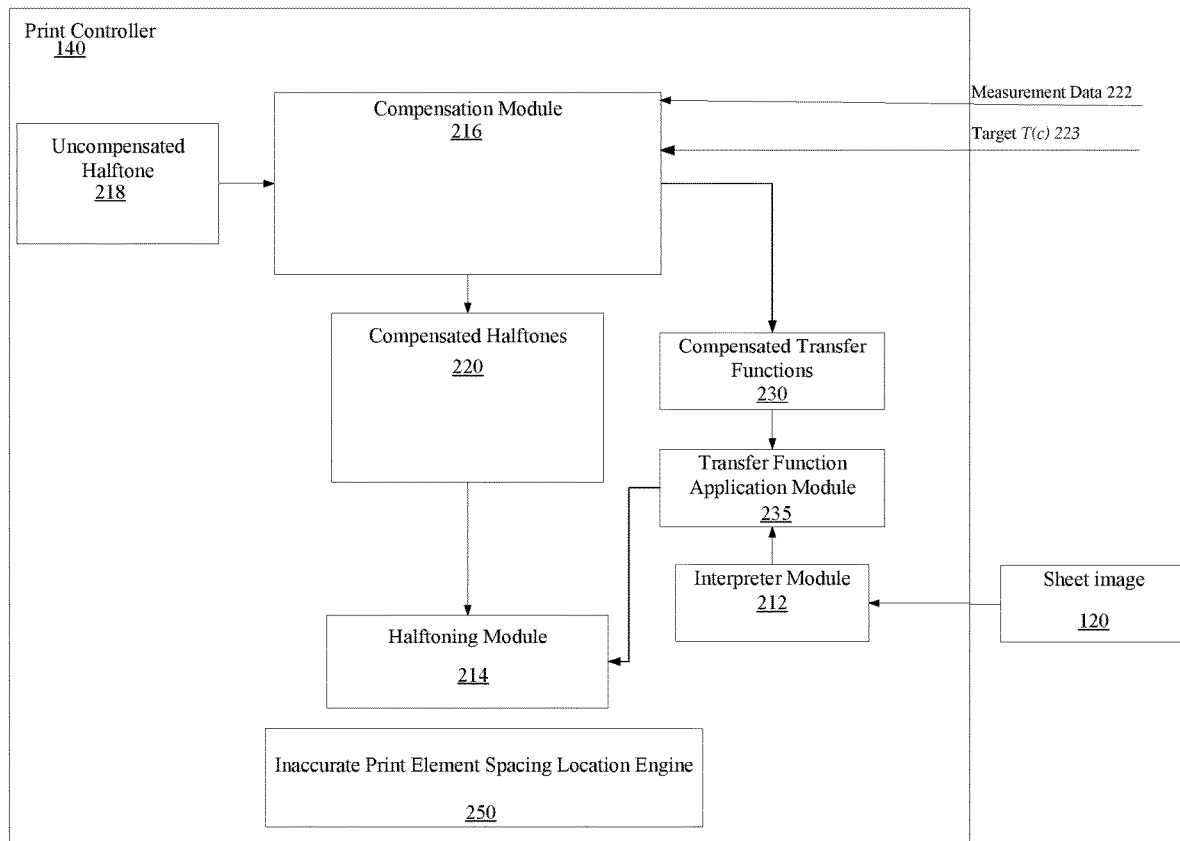
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheetside images such as sheet image 120) of a print job into sheetside bitmaps. The sheetside bitmaps generated by the interpreter module 212 are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, print controller 140 may implement transfer functions (e.g., compensate transfer functions) applied directly to image data as a part of the image processing prior to printing. In that case, the contone image data (CTI) is transformed (e.g., compensated) by the transfer functions prior to halftoning.

Halftoning module 214 is operable to represent the sheet-side bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger instructed drop sizes, beginning with zero and ending with a maximum drop size (e.g., none, small, medium and or large). The halftone design may be implemented as threshold arrays (e.g., halftone threshold arrays) such as single bit threshold arrays or multibit threshold arrays. In another embodiment, the halftone design may include a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. The set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the contone pel values in the sheetside bitmap.

This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold or thresholds and image contone data for each pel. Multi-bit defines a power of two set of drop sizes (e.g., two-bit halftone designs have four total drops, including a zero drop size). While the power of two may be employed to define the number of drops, systems not following this such as a three total drop system may be used and are still considered multi-bit.

Figure 3A:
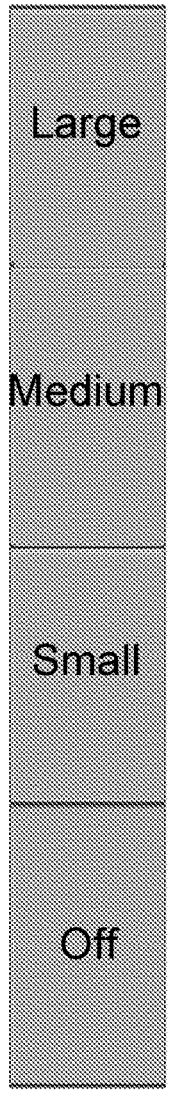
FIG. 3A illustrates one embodiment of multibit halftone designs, where the halftones are described using multi-bit threshold arrays (MTAs)

For multi-bit halftones, as shown in FIG. 3A, the MTA is a three-dimensional array including one two-dimensional array for each drop size transition. Thus an MTA includes a set of two-dimensional arrays of thresholds for transition between drop sizes: plane one provides the threshold for the Large output level, while plane 2 and plane 1 provide thresholds for the Medium output level and plane 3 provides the thresholds for the Small output level for a system having three drop sizes not including zero drop size (none or off). In other embodiments, different one-to-one relationship may be used since the correspondence between plane numbers and drop sizes is arbitrary.

To use these threshold arrays for halftoning, in the case where the threshold arrays are smaller than the sheetside map, each multibit threshold array is tiled across contone image data provided by the sheetside bitmap, which provides a set of threshold values for each pel in the sheetside bitmap. The contone image data (e.g., gray level data) is logically compared to the threshold data on a pel basis. In the case of Large drops, they are produced by halftoning when the image contone data is greater than the respective large threshold values in plane 1.

Medium drops are produced when the image data is greater than the medium drop plane 2 thresholds and also the image data is less than or equal to the large drop thresholds in plane 1. Small drops are produced when the image data is greater than the small drop thresholds in plane 3 and also the image data is less than or equal to the medium drop thresholds in plane 2.

Finally, the off/none drop size occurs for cases when the contone values is less than or equal to the small drop thresholds in plane 3. In this embodiment of a two-bit multibit printing system, this set of four logical equations, used with thresholds from each plane of the multibit threshold array permit each printing drop size to be defined, based on the contone values.

Alternate versions of the halftoning equations may also be defined. An example of an alternate set of halftoning logical expressions replaces the less than or equal to operation with less than and the greater than operation is replaced with greater than or equal too. A further variation that does not employ a parallel implementation of halftoning uses the less than or equal to and greater than logical expressions starting with the test for the largest drop size first. If a drop size is not found the process continues with the logical expression for the next smallest drop size. If the sequential test for each drop size does not find a drop size, the none drop size is assumed. The threshold arrays for each different set of halftoning equation will vary and therefore the threshold array are generated assuming a given set of equations.

In other embodiments, the number of planes of threshold data can be extended to handle any number of drop sizes. The data from these two-dimensional arrays may be segmented into separate memory regions and stored in any convenient order. For example, the thresholds for each drop size transition may be stored contiguously in memory, and it is often advantageous to do so.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response (e.g., measurement data 222) are received via measurement module 190 using the un-compensated halftone 218 for printing the test chart.

Compensation module 216 also performs a compensation process to generate compensated transfer functions 230. Compensated transfer functions 230 are then received at transfer function application module 235. Transfer function application module 235 applies the received compensation transfer functions 230 to print image data received from interpreter module 212 prior to performing halftoning at halftoning module 214. In one embodiment, a transfer function comprises a mapping of an input digital count (or tint) to an output digital count for a system, where digital count is the gray level or color value representing the pels in a bitmap 150 (FIG. 1). Transfer functions may be received or generated (e.g., generated based on target OD versus input digital count data and measured OD versus output digital count data).

Printhead Gap Compensation

A printhead gap artifact is a print defect (e.g., pel forming element artifact) caused by ink jet nozzles that have non-ideal spacing between adjacent nozzles (e.g., nozzles that are too close or too far apart) where the result is too much or too little ink deposited on the print medium in the region between the adjacent nozzles.

According to one embodiment, compensation module 216 is implemented to perform uniformity compensation for inaccurate spacing between pel forming elements 165. In such an embodiment, inaccurate spacing between pel forming elements 165 may result from printhead gaps. Printhead gap is defined as the region between the edge nozzles of adjacent printheads. It should be noted that pel forming elements in the printhead gap region are functional elements properly ejecting ink. Printhead gaps may result from an incorrectly (e.g., inaccurately) spaced separation distance between adjoining printheads 162 (printhead overlap or underlap). This incorrect gap may occur during manufacturing of the printer, after replacement of a printhead 162 or some other physical change of the printhead 162. As used herein, uniformity compensation is defined as a calibration to compensate for measured response differences at a single pel, by a pel forming element 165 (e.g., print head nozzle).

According to one embodiment, compensation module 216 is implemented to perform printhead gap uniformity compensation to correct overlapping pel forming elements 165 at adjacent printheads 162. Compensation module 216 receives measurement data corresponding to a print medium printed with a plurality of pel forming elements in adjacent printheads and a plurality of tint levels, wherein the plurality of pel forming elements comprise printhead gap adjacent pel forming elements that print with applied compensation transfer functions (e.g., print gap compensation transfer functions) and non-gap adjacent pel forming elements that print without the compensation transfer functions (e.g., print gap compensation transfer functions) applied. Additionally, compensation module 216 associates measurement data values with the printhead gap adjacent pel forming elements, the applied compensation transfer functions and the plurality of tint levels and determines optimal compensation by selecting the compensation transfer functions that have corresponding measurement data values closest to compensation target values for each of the plurality of tint levels.

In an alternative embodiment, compensation module 216 receives measurement data corresponding to a print medium printed with a plurality of pel forming elements in adjacent printheads and a plurality of tint levels, wherein the plurality of pel forming elements comprise printhead gap adjacent pel forming elements that print with applied compensation halftones. Compensation module 216 further associates measurement data values with the printhead gap adjacent pel forming elements, the applied compensation halftones and the plurality of tint levels and determines optimal compensation by selecting the compensation halftones that have corresponding measurement data values closest to compensation target values for each of the plurality of tint levels.

Figure 4:
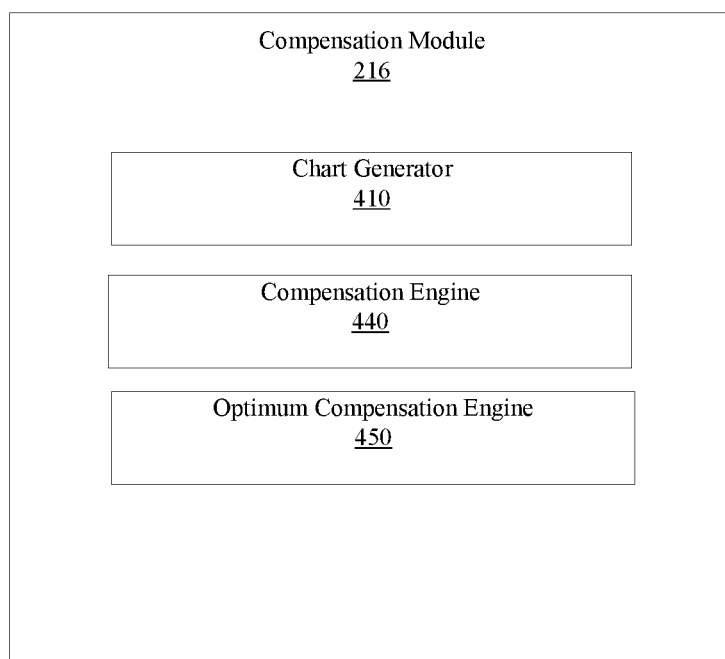
FIG. 4 illustrates one embodiment of compensation module.

FIG. 4 illustrates one embodiment of compensation module 216. As shown in FIG. 4, compensation module 216 includes a chart generator 410 implemented to print a test chart. In one embodiment, chart generator 410 generates a print image (e.g., print image for the test chart). According to one embodiment, the test chart comprises a number of existing (e.g., actual) printhead gaps between pel forming element 165 identified to be the outer pel forming elements from adjacent printheads that form gap adjacent pel forming elements when printhead modules are arranged to create a printhead array (e.g., 10 printhead gaps created from 11 adjacent printhead modules) on print medium 180.

Figure 3B:
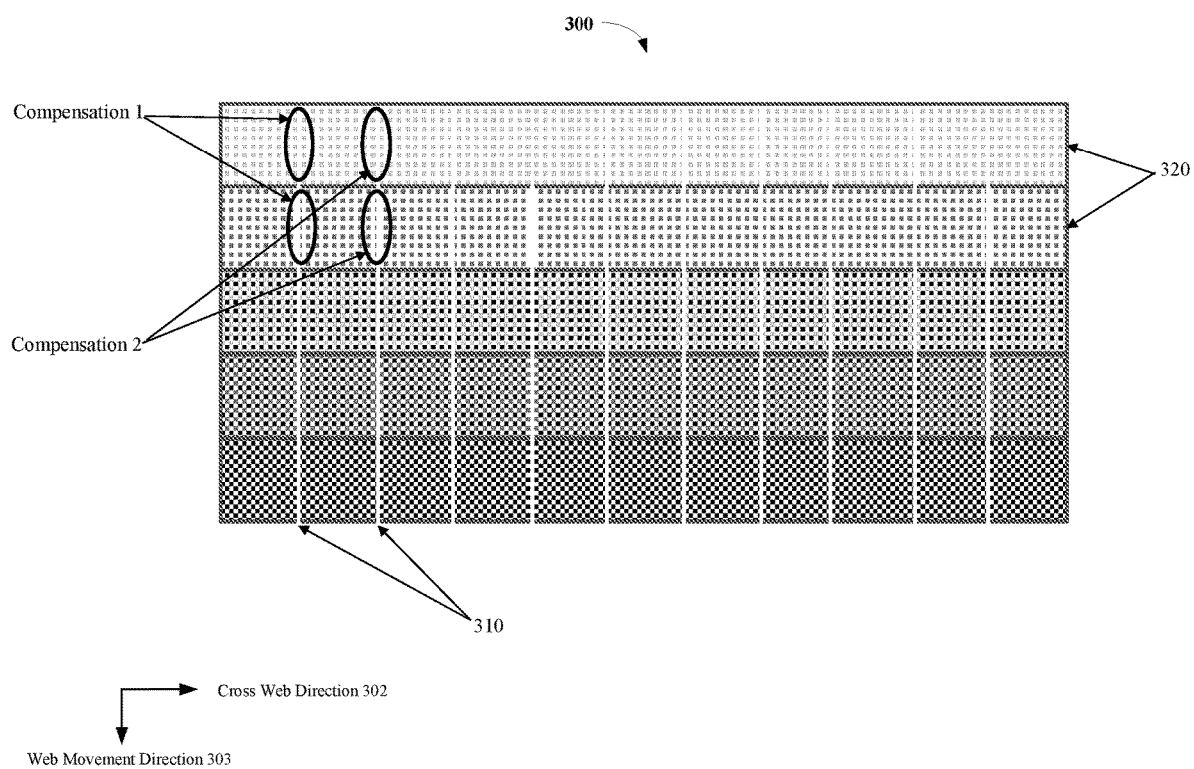
FIG. 3B illustrates one embodiment of a test chart.

FIG. 3B illustrates one embodiment of a test chart 300. As shown in FIG. 3B, test chart 300 includes printhead gap columns 310 located between end pel forming elements(e.g., Right end pel forming element from a first printhead located to the left side of the leftmost location 310 and left end pel forming element from a second printhead located to the right) that run in a web movement direction 303. Column 310 is where potential artifacts are formed at the existing printhead gap locations. Columns 310 are positioned where potential print artifacts will be situated where artifacts appear as narrow light or dark streaks or bands running in the web movement direction 303. These printhead gap/artifact locations are known based on the nozzle locations in the set of printhead modules forming the printhead array (e.g., based on the known design of printer 160). Additionally, test chart 300 includes rows of uniform tint level 320. In one embodiment, the tint levels may be the same in cross web direction 302 or may vary in the web movement direction 303, where the cross web and web movement directions will be discussed in more detail below. In a further embodiment, compensation is applied to pel locations adjacent to the printhead gaps. The applied compensation may vary in the cross-web direction or may be the same in the web movement direction 303. Multiple charts 300 may be required to simulate multiple levels of applied compensation to the printhead gap regions.

The test chart is created with print instructions processed by printing system 130. A printhead gap region is created between target pel forming element 165 locations by print instructions that result in the target pels being located to the left and to the right of the printhead gap. Pel forming elements adjacent to the printhead gap location are instructed to eject ink with an applied compensation level. Adjacent pel forming elements may be the 1, 2, 3, 4 or more pel forming element locations next to the printhead gap location and located to the left and right side of the printhead gap. Therefore, if two total compensation pels are employed, one compensating element may be located to the left side and the other compensating element to the right side of the printhead gap. The test chart may be designed to include different compensation levels applied to the adjacent pel forming elements to the printhead gap, and different tint levels (e.g., digital counts) applied to the adjacent pel forming elements. In a further embodiment multiple sets of different tint levels each set having different compensation levels can be stacked along the web movement direction to create a compact version of the chart.

The test chart may further be designed with printhead gaps staggered from each other in the cross web direction 302, the different compensation levels applied in the cross web direction 302 (e.g., the applied compensation is the same in the web movement direction 303), and the different tint levels applied in the web movement direction 303 (e.g., the plurality of tint levels are the same in the cross web direction 302). A benefit of these test chart design element arrangements is a compact size of the printed test chart. In a further embodiment, the image of the printed test chart is measured by measurement module 190 (e.g., via a scanner). In such an embodiment, measurement module 190 generates print image measurement data across the web of the print medium for pel corresponding to pel forming elements 165. The resolution (e.g., scanner DPI) of the pel reading elements (e.g., sensors) resolution in measurement module 190 may be different than the resolution of the pel forming elements 165 (e.g., printhead DPI). In a further embodiment the locations of printhead gaps are at a position where an inaccurate spacing compensation between pel forming elements within a printhead 162 is desired, instead of at printhead gap locations. This provides a means to correct artifacts caused by spacing variations not associated with a printhead gap.

In one embodiment, chart generator 410 prints a test chart similar to discussed above, which is measured by measurement module 190 to generate print image measurement data. However, in this embodiment the test chart is configured to include locator marks that indicate the location of printhead 162 gaps (e.g., end pel forming elements 165 of adjacent printheads 162). Compensation engine 440 subsequently uses the print image measurement data, as well as compensation measurement data to perform uniformity compensation to generate compensation data.

Figure 5:
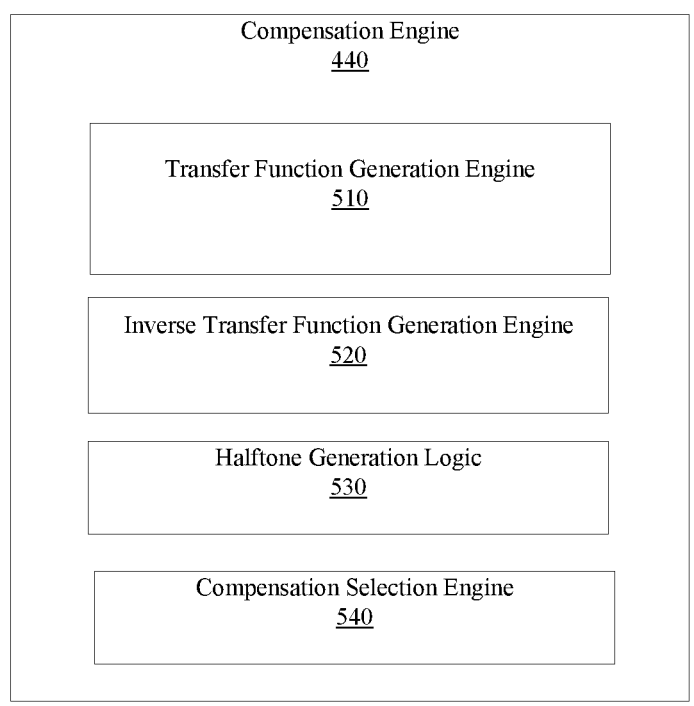
FIG. 5 illustrates one embodiment of compensation engine.

Compensation engine 440 performs uniformity compensation to generate compensation data (e.g., transfer functions or inverse transfer functions) based on the print image measurement data and compensation measurement data. FIG. 5 illustrates one embodiment of compensation engine 440. As shown in FIG. 5, compensation engine 440 includes transfer function generation engine 510 and inverse transfer function generation engine 520 that are used to generate transfer functions and inverse transfer functions (ITF), respectively, for each of the pel forming elements 165 based on measured data (e.g., measurement data 222) and a received or generated uniformity compensation baseline target (e.g., target 223) for each different tint level c. Where c corresponds to the different tint levels 320 in chart 300.

Transfer function generation engine 510 generates transfer functions (e.g., uniformity compensation transfer functions) for each of the plurality of color planes. Inverse transfer function generation engine 520 generates inverse transfer functions for each of the plurality of color planes. Inverse transfer functions are used to transform (e.g., modify) the thresholds of a halftone threshold array. An inverse transfer function is the reversed (e.g., inverted) application of the transfer function, where the output digital count values of the transfer function form the input digital count values of the inverse transfer function (ITF) and the input digital count values of the transfer function form the output digital count values of the inverse transfer function. In one embodiment, inverse transfer functions may be derived from transfer functions as a mathematical determination of the inverse function of the transfer functions.

Figure 6:
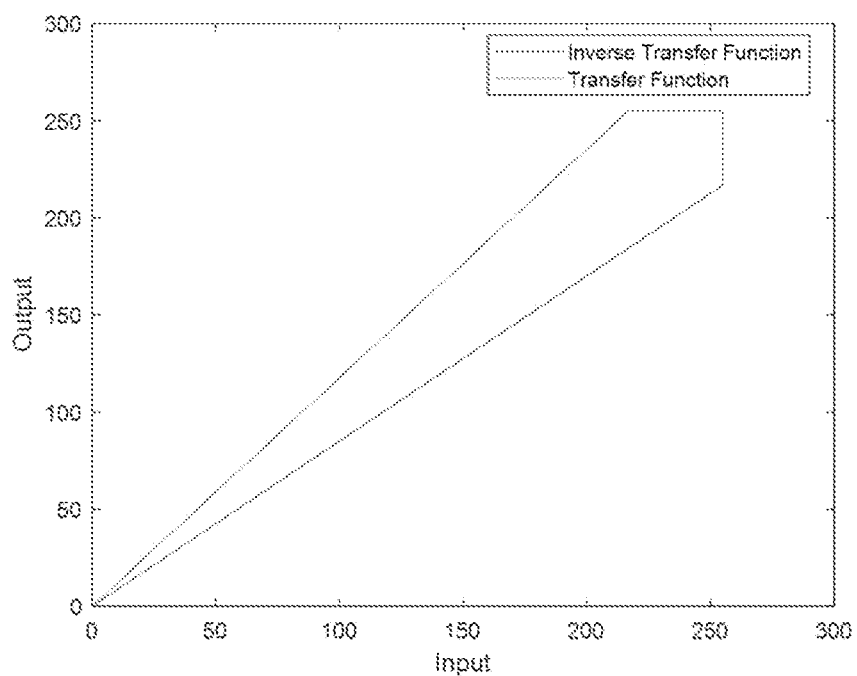
FIG. 6 illustrates one embodiment of an inverse transfer function for a nozzle.

FIG. 6 illustrates one embodiment of deriving an inverse transfer function from a transfer function of a nozzle for all digital count levels. As shown in FIG. 6, assuming the compensation TF applied to a specific nozzle k is linear and represented by $TF_k$, then the inverse of the transfer function is given by $TF_k^{-1}$. ITF is a reflection of the TF about the identity Transfer function where OutputDC=InputDC. Thresholds transformed by the ITF which are equal to or greater than the largest digital count are replaced by the threshold value ($2^{bitdepth}-1$). Where bitdepth is the halftone threshold array bitdepth. This ensures that drop sizes for pels that never print using the input threshold array continue to not print when using the corrected/transformed threshold array.

In one embodiment for each color and tint level c, the same target value is used for all nozzles to achieve uniform printing for the same color and tint level c. In one embodiment, the input and output color values are the digital count (DC) levels, which are 0 to 255, for a typical 8-bit printing system. Target T(c) may be set the same for all nozzles to provide uniformity between all nozzles. The target T(c) represents the ideal level for each tint level c that would be achieved if the printhead gap artifact is not present, viz. perfectly corrected.

Once inverse transfer functions have been generated, halftone generation logic 530 generates an updated uniformity compensated halftone by modifying all of the thresholds in each column of the current halftone threshold array of the current halftone design using the generated inverse transfer function for each respective pel forming element 165. Where each column in the threshold array corresponds to a pel forming element 165. In one embodiment, the inverse transfer function for each column (or nozzle) (k) is used at each iteration to transform the current threshold values of the current halftone design (e.g., uncompensated halftone design). This creates threshold values for the compensated halftone design. This process generates thresholds in the compensated threshold array, based on the corresponding thresholds from the current threshold array. In the case where no changes to thresholds are required so as to not apply any compensation the generated ITF for those columns (or nozzle) k is an identity inverse transfer function. An identity transfer function has output thresholds that are equal to the input threshold values.

Once generated at compensation engine 440, optimum compensation engine 450 processes the compensation data (e.g., uniformity compensation transfer functions and uniformity compensation inverse transfer functions) for each pel forming element 165 to determine an optimal compensation for each tint level. In one embodiment, optimal compensation comprises determining the optimal transfer function/inverse transfer function that is best for compensation. The family of candidate transfer functions/inverse transfer functions may be represented by $DCoutput=TF_k=(m_k*DCinput)$; or $DCoutput=ITF_k=(n_k*DCinput)$, where k is the nozzle number, and $m_k$ is the slope of the transfer function curve for nozzle k and $n_k$ is the slope of the inverse transfer function curve for nozzle k. In such an embodiment, an optimal compensation (e.g., optimal slope) obtained from the family of candidate transfer functions/candidate inverse transfer functions is used to compensate for each tint level for printhead gaps that occur at a pel forming element 165.

Figure 7:
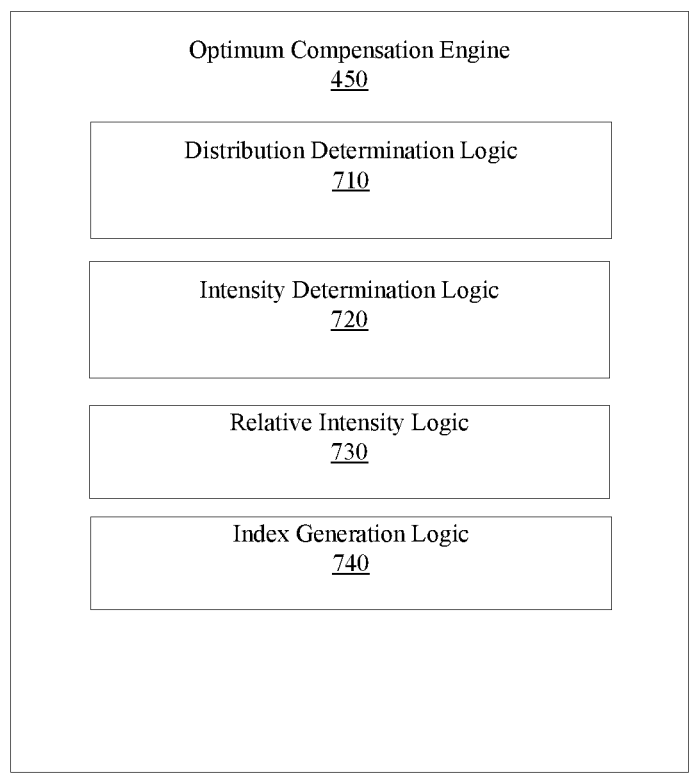
FIG. 7 illustrates one embodiment of an optimum compensation engine.

FIG. 7 illustrates one embodiment of an optimum compensation engine 450. As shown in FIG. 7, optimum compensation engine 450 includes distribution determination logic 710 that generates a plurality of distributions at each tint level. The actual location of a printhead gap artifact is midway between pel forming elements 165. Furthermore, the pel reading elements in the image measurement system 190 may not match precisely to the pel forming elements 165 due to an offset between devices as well as differences between the resolutions. The following describes the ideal regions in the pel forming domain. These regions have corresponding pels in the image measurement system 190 (e.g., reading system) that are used to obtain measurements. The set of pel reading elements having the best correspondence to the respective regions in the ideal pel forming domain may be used (e.g., nearest neighbor). In such an embodiment, distribution determination logic 710 generates a first distribution at each of a plurality of tint levels for pels in a first region surrounding a printhead gap location midway between pel forming elements j and j+1 (e.g., j−2:j+3). Generate a second distribution at each of the plurality of tint levels for pels in a second region (e.g., baseline region 2) to the left of the printhead gap location (e.g., j−9:j−3) and generate a third distribution at each of the plurality of tint levels for pels in a third region (e.g., baseline region 3) to the right of the printhead gap location (e.g., j+4:j+10)

In one embodiment, the distributions describe values within the regions of measurement values. In this embodiment, the evaluated regions 2 and 3 are displaced from the printhead gap and applied compensation (e.g., in the evaluated region, the pel forming elements print without compensation applied) so that a target (e.g., target baseline) may be determined that yields the benefit of establishing a target response that is relative. By using regions of the measurement values to the immediate left (e.g., target baseline region 2) and right (e.g., target baseline region 3) of the printhead gap in the cross web direction 302 to determine a target response, an improved target response (e.g. relative response) may be determined that yields the benefit of ignoring unrelated measurement variations in the cross web direction 302 such as variations between adjacent printheads. As used herein, a distribution is defined as Gaussian distribution (or normal). In this example compensation would be applied using transfer functions or ITF for pels/columns associated with pel forming elements at j and j+1 assuming two total pels are employed for the compensation. In this case the compensation is being applied to the pel j immediately to the left and the pel j+1 immediately to the right of the printhead gap.

Distribution Determination logic 710 determines a set of $M1_{j,k,n}$, $M2_{j,k,n}$ and $M3_{j,k,n}$ parameters obtained by fitting a distribution to scanned image measurement values corresponding to regions 1, 2 and 3 for printhead gap pel location j, tint level index k and candidate compensation level index m. It should be understood that for convenience a single value j is used to identify the printhead gap that occurs between pel j and pel j+1. This provides a single integer value corresponding to each printhead gap since pel locations are integer. Where region 1 corresponds to the printhead gap j, region 2 is to the left of gap j and region 3 is to the right of gap j. Intensity determination logic 720 determines intensity values (e.g., amplitude values) for each printhead gap j, for a plurality of tint levels k and a plurality of compensation slopes n. In one embodiment, relative intensity is defined as an intensity difference. Relative intensity logic 730 generates relative intensity values based on the first, second and third region average measurement values. According to one embodiment, the relative intensity values are generated by determining a difference between the first region average and the second region average and a difference between the first region average and the third region average. In such an embodiment, a relative intensity between region 1 and 2 for gap j, tint level k and compensation slope index n is represented as $D1_{j,k,n}=|(M1_{j,k,n}-M2_{j,k,n})|$, while the relative intensity between region 1 and 3 is represented as $D2_{j,k,n}=|(M1_{j,k,n}-M3_{j,k,n})|$. $D1_{j,k,n}$ and $D2_{j,k,n}$ are averaged for each gap j, tint index level k and compensation slope index n, such that $A_{j,k,n}=(D1_{j,k,n}+D2_{j,k,n})/2$. Index values are used for k and n since the tint levels and candidate compensation slope values are non-integers. Therefore an index value of one for k corresponds to the first tint level c and an index value of one for n refers to the first candidate of the compensation slope values of the set of slopes.

Relative intensity determination logic 730 determines relative intensity values of printhead gaps for gap adjacent pel forming elements 165 associated with each printhead pel 162 gap and each of a plurality of tint levels (or $A_{j,k,n}$, where j represents a printhead 165 gap, k represents a tint level and n is the index of compensation slope values).

Intensity determination logic 720 generates a first average measurement value of the first distribution (e.g., the printhead gap region), generates a second average measurement value of the second distribution (e.g., target baseline region 2) and generates a third average measurement value of the third distribution (e.g., target baseline region 3). Measurement responses are obtained by averaging measured image data (e.g., image intensity values) in the web movement direction 303 for each tint level. In one embodiment, the first average measurement value represents an average intensity (e.g., mean of the normal fitted distribution) associated with the first region (M1), the second average measurement value represents an average intensity associated with the second region (M2) and the third average measurement value represents an average intensity associated with the third region (M3).

Optimal compensation occurs when the average of the relative intensity values is minimum. Since D1 and D2 are expected to be smallest with the best compensated printhead gap, location D1 and D2 are averaged, such that $D=(D1+D2)/2$. This results in a minimum D (average of the relative intensity values) in the best compensated printhead gap location.

Index generation logic 740 generates an index associated with the compensation data and a relative intensity value. In one embodiment, a relative intensity value represents a proximity between the measurement response value (e.g., image intensity) to the target response (e.g., variance) for each of the plurality of tint levels. In one embodiment, the relative intensity values are associated with candidate transfer function or candidate inverse transfer function slope data. The optimal index value points to the TF/ITF candidate slopes having the minimum variations between the three measured responses. An optimal index value is obtained for each tint level of the test chart. Each index is associated with a different slope. The slopes associated with the optimal index values for a single printhead gap are combined to determine a single optimal slope for the case where a plurality of slopes is reduced to a single representative slope defining a linear TF/ITF. In one embodiment, determining the optimal compensation comprises determining the compensation target values based on measurement data values corresponding to baseline regions, wherein the baseline regions correspond to one or more of the non-gap adjacent pel forming elements that print without the compensation transfer functions applied.

In this embodiment, index generation logic 740 determines the optimum slope (e.g., $TF_j/ITF_j$ slope) for each gap (j) between printheads 162 based on the intensity values $A_{j,k,n}$ finding the optimal $TF_j/ITF_j$ slope for each gap j based on the min root mean square (RMS) values $A_{j,k,n}$ and all k and each slope index n. This produces an optimal slope goodness metric for each gap j for each slope index n. A further improvement to obtain the optimal $TF_j/ITF_j$ is to generate a regression assuming a parabolic function based on the RMS intensity values for each gap j vs slope values associated with the n different slopes employed in the printed charts. Using well known methods to determine the location of parabolic function minimum, compute the optimal $TF_j/ITF_j$ slope. This slope will be located where the RMS fitted values are minimum. The optimal $TF_j/ITF_j$ slope for each gap j will be unique since each slope value depends on the actual printhead gap distance, which is unknown.

Subsequently, optimum transfer function and/or inverse transfer function compensation data is generated to be used during production printing (e.g., printing of a print jobs and not test prints) to compensate for each identified printhead gap or inaccurate spacing between pel forming elements 165. In halftone compensation embodiments, the inverse transfer function compensation data may be implemented to generate compensated halftone designs by modifying halftone threshold arrays with the compensation inverse transfer functions, which are transmitted to be used to compensate for each identified printhead gap or inaccurate spacing between pel forming elements 165.

Figure 8:
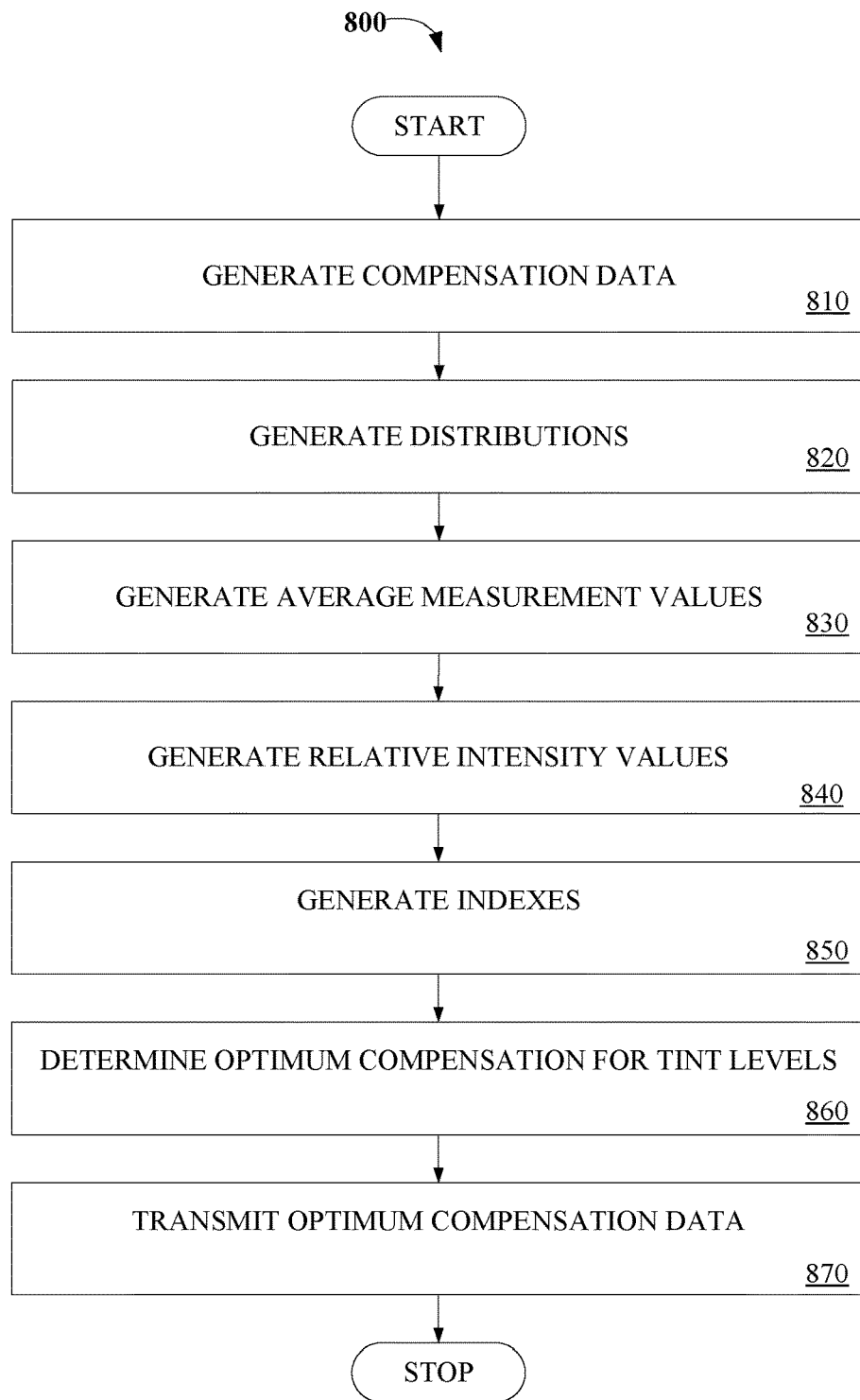
FIG. 8 is a flow diagram illustrating one embodiment of a process for determining an optimum compensation for inaccurate separation distance between pel forming elements.

FIG. 8 is a flow diagram illustrating a process 800 for determining an optimum compensation for printhead gaps or inaccurate spacing between pel forming elements 165. Process 800 may be performed by processing logic that may include hardware (e.g., circuitry, dedicated logic, programmable logic, microcode, etc.), software such as instructions run on a processing device, or a combination thereof. In one embodiment, process 800 is performed by compensation module 216.

At processing block 810, compensation data is generated for the candidate compensation set (e.g., transfer functions, inverse transfer functions and halftone designs). At processing block 820, the distributions associated with the immediate region of the printhead gap location and to the left and right of the printhead gap location for each of a plurality of tint levels and plurality of compensation TF/ITF slopes is generated. At processing block 830, the average measurement values associated with each average distribution are generated.

At processing block 840, relative intensity values are generated based on the first, second and third average measurement values. At processing block 850, indexes associated with the relative intensity values are generated for each of the plurality of tint levels. At processing block 860, optimum compensation data (e.g., transfer function or inverse transfer function) associated with each tint level is determined for the pels identified to be used for compensation for each targeted printhead gap (e.g., two total or four total elements). At processing block 870, the optimum compensation data is transmitted.

In an alternative embodiment, the optimum compensation data may be implemented to generate a single transfer function (or inverse transfer function) for each pel forming element 165 in the group of pel forming elements spanning a printhead gap (e.g., the gap adjacent pel forming elements) comprising a separate compensation level for each tint level. In this embodiment, the transfer function/inverse transfer function comprises a continuous piecewise linear transfer function/inverse transfer function including a plurality of compensation levels, where each compensation level corresponds to an index associated with a tint level. In this embodiment, each compensation level corresponds to an optimal compensation associated with each of the plurality of tint levels. A benefit of generating and applying a continuous piecewise linear transfer function/inverse transfer function is greater compensation accuracy. In this case the TFs or ITFs are described by a set of piecewise linear functions where the optimal slopes for each piece are determined for each different tint level in the test chart. In this case the piecewise functions are generated to represent a continuous function for all DC levels, hence a set of intercepts for each piece are generated to achieve continuity of the piecewise function.

The domain for each piece of the function is based on the tint levels in the test chart (e.g. domain of first piece based 5% tint level is 0-10%). DCoutput=$TF_{ki}$=($m_{ki}$*DCinput)+$c_{ki}$, where i denotes each segment of the piecewise function having intercept values cam. K is printhead gap number (e.g., index). Similarly for the ITF, DCoutput=$ITF_{ki}$=($n_{ki}$*DCinput)+$d_{ki}$, where i denotes each segment of the piecewise function having intercept values $d_{ki}$ with k being the printhead gap number. The index values may be used to determine the optimal slopes for each piece of the piecewise linear functions. The set of intercept values are determined to obtain continuous piecewise functions where each line segment matches the end points of the adjacent line segment. In an alternate embodiment the intercepts for each piece are assumed to be equal to zero and the domains for each piece are defined based on the intersections of each piece. In a further embodiment a smooth spline is fit though the DCoutput values for each optimal candidate slope at the DCinput level corresponding to the tints in the chart.

Figure 9:
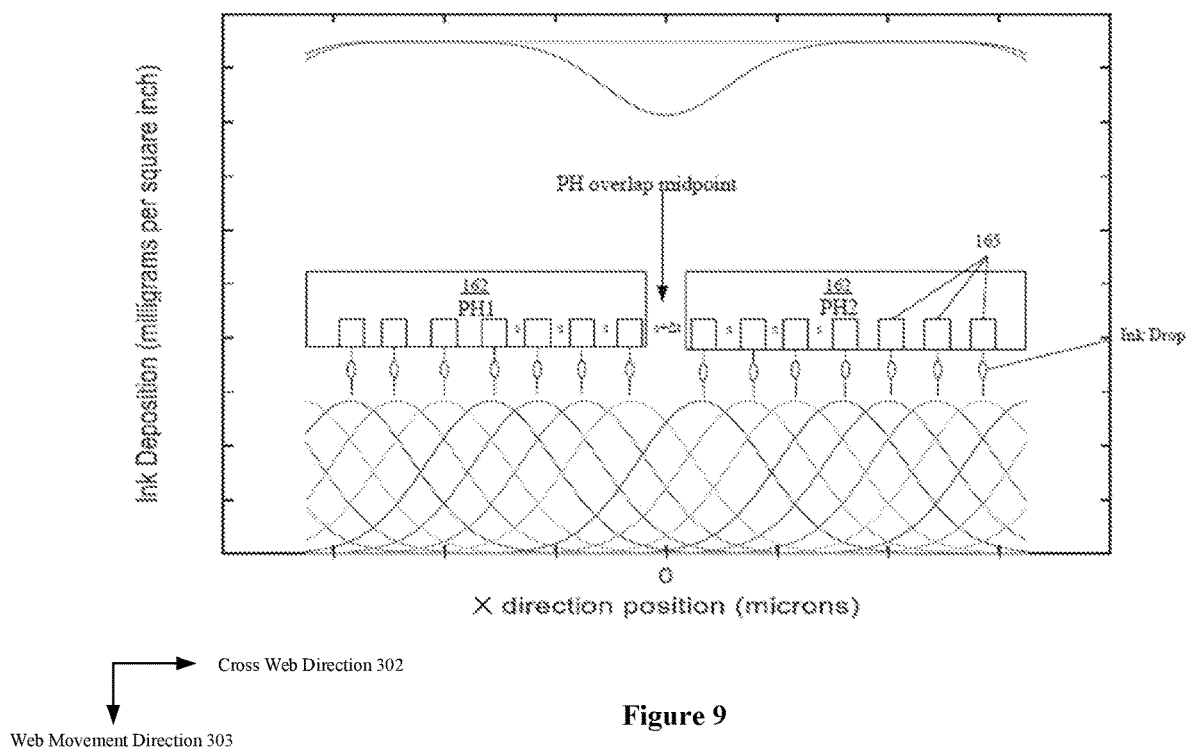
FIG. 9 illustrates one embodiment of ink deposition with printhead gap.

FIG. 9 shows two adjacent print heads 162 including pel forming elements 165 that each generate ink drops 901, where the printheads 162 are separated by a gap amount s plus delta t. FIG. 9 also illustrates one embodiment of a printhead 162 gap ink deposition without compensation (e.g., without gap compensation) for adjacent printheads 162 (PH1 and PH2), where the midpoint between pel forming elements for the two printheads is defined to be at x=0 and the printheads are too far apart. The top curve is the large-scale ink deposition for an ideal gap and is the total amount of ink deposited in a unit area for an input digital count by an array of properly functioning pel forming elements with correct gap between the printheads. The middle curve shows the large-scale total ink deposition for a non-ideal gap for the same digital count as the top curve with the valley corresponding to the non-ideal gap between the two printheads. The family of curves at the bottom show the ink deposition for each of the ink jet nozzles, where each Gaussian curve is associated with a pel forming element 165.

Each of the printheads 162 (PH1 and PH2) comprise pel forming elements 165 that are physically spaced apart a distance s (e.g., nominal spacing for pel forming elements 165, s=1/DPI) in the X direction. The physical distance amount between the outer pel forming element 165 of PH1 and the adjacent outer pel forming element PH2 is s plus delta t (e.g., $\Delta$t). In this case delta t is positive indicating that the gap between the two printheads is too large. In other cases, delta t is negative indicating that the gap between the two printheads is too small. In either case, s plus delta t may be referred to as the printhead gap amount.

The corresponding pel forming elements 165 adjacent to the printhead gap are all displaced from their ideal locations. The pel forming elements 165 to the left of the printhead gap at x=0 have all been displaced to the left from their ideal locations by an amount delta t/2. Similarly, the pel forming elements 165 to the right of the printhead gap have all been displaced to the right from their ideal locations by an amount delta t/2. This displacement produces anomalous contributions of ink deposition from each pel forming elements so as to create a deficit of ink deposition in the region surrounding the printhead gap. In this case jets that are further apart than ideal produces a light streak at the x=0 location due to the deficit of ink deposition contributions.

Figure 10:
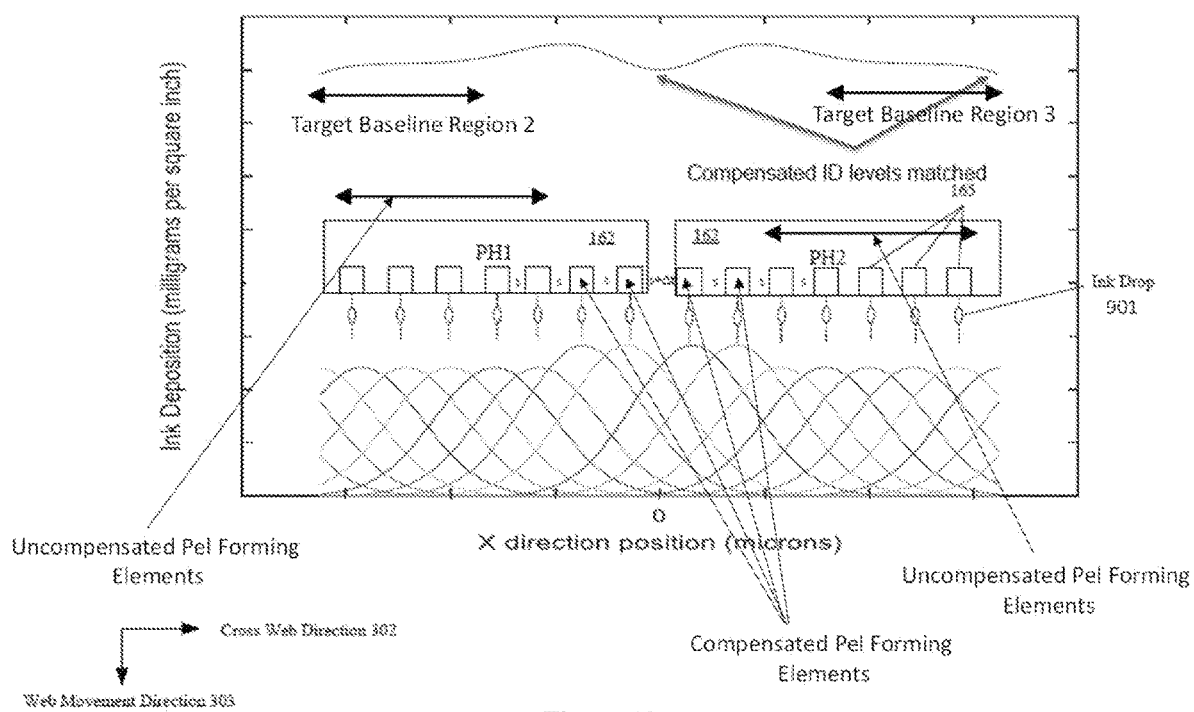
FIG. 10 illustrates one embodiment of a compensation for a printhead gap.

FIG. 10 illustrates one embodiment of a compensation of gap adjacent pel forming element 165 relative to the location of a printhead 162 gap between adjacent printheads 162 (e.g., PH1 and PH2). In this embodiment, the midpoint between two pel forming elements at the edges of the adjacent printheads is located at the middle of the plotted data (e.g., position x=0). Four Gaussian ink deposition profiles have been boosted, two on each side of the midpoint, to compensate for the missing ink deposition (e.g., the valley) created by the gaps (e.g., printheads too close). The compensation levels applied to these four compensated nozzles at each DC is obtained from the compensation module 216. The curve at the top shows the total ink deposition from all of the Gaussian profiles at a DC level (e.g., DC level 242). The top curve illustrates that the boosted output from four nozzles provided an increased ink deposition so that the level in the gap region is equal to the ink deposition outside the printhead gap region (e.g., near the edges). The arrows point to the valley and edge region where ink deposition is matched. Without the printhead gap compensation, the set of Gaussians will all be the same and there will not be any boosted nozzle outputs.

Four Gaussians have been boosted in this example (e.g., pel forming elements with compensation applied), two on each side of printhead gap, to compensate for the missing ink deposition created by the printhead gap artifact. The compensation applied to these four compensated pel forming elements 165 (e.g., nozzles) at each DC (e.g., tint level) is obtained from the compensation transfer functions or compensation halftones as will be explained later. Uncompensated pel forming elements are located left of the left most compensated pel forming elements and to the right of the right most compensated pel forming elements. The uncompensated pel forming elements do not have compensation applied and their corresponding ink deposition profiles can be seen to have lower values than the compensated ink deposition profiles.

The measurement data 222 curve (not shown) at a specific tint level for the case shown with a printhead gap in FIG. 9 would be similar to the middle total ink deposition curve (whether it is proportional or inverse proportional to the middle total ink deposition curve depends on the measurement data sensors and any data processing). The measurement data 222 curve will vary for each different tint level in the test chart. Cross web direction 302 indicates the X direction positions of the pel forming elements 165 and ink drops 901, while web movement direction 303 (e.g., web path direction) indicates the print medium direction of travel in relation to the pel forming elements 165 and ink drops 901.

While the example shows pel forming elements on each side of the printhead gap that have all been displaced from their ideal positions, in the case of inaccurate spacing between pel forming elements, as few as two elements may be displaced from their ideal locations (e.g., one on each side of an anomaly) while the other adjacent pel forming elements are all located nominally. In this case the location of the artifact produced by inaccurate pel element spacing may be detected in the measurement data and the charts generated with compensation elements located surrounding the artifact location to obtain compensation for the artifact in the same manner as used with printhead gap correction.

According to one embodiment, the compensation data is generated by generating transfer functions and inverse transfer functions for each gap location between printheads 162 (e.g., via transfer function generation engine 510 and inverse transfer function generation engine 520, respectively). In such an embodiment, compensation is performed using one or more of the outer pel forming elements 165 on each side of the printhead gap location (e.g., between PH1 and PH2).

Compensation Selection

Referring back to FIG. 5, compensation selection engine 540 receives the optimum compensation data and selects transfer functions or halftone designs based on printhead gaps between pel forming elements 165 that have been detected. In one embodiment, information regarding printhead gaps between pel forming elements 165 locations and/or inaccurate spacing between pel forming elements are received from an inaccurate pel forming element spacing location engine 250 (FIG. 2). Pel forming element location refers to a unique identifier for the pel forming element 165/printhead gaps, such as logical address or physical location on the corresponding printhead 162.

Figure 11:
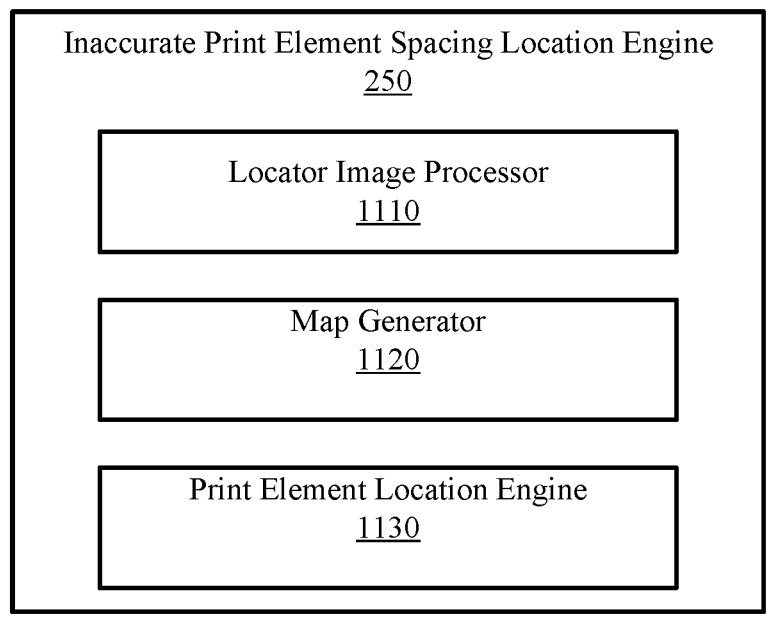
FIG. 11 illustrates one embodiment of gap adjacent print element location detector.

FIG. 11 illustrates one embodiment of an inaccurate pel forming element spacing location engine 250. According to one embodiment, inaccurate pel forming element spacing location engine 250 identifies a list of inaccurately spaced print element locations associated with detected printhead gaps (e.g., inaccurate pel forming element spacing pels locations). In such an embodiment, inaccurate pel forming element spacing location engine 250 includes locator image processor 1110 to receive measurement data 222 (e.g., image scan data) of printed print medium 180 (via measurement module 190), analyzes the image scan data to detect printhead/gaps (e.g., printhead gap artifacts) associated with one or more inaccurate spacing between pel forming elements 165 or other markings and their cross web direction 302 position coordinates in the image based on measurement data 222 intensities and reference print information (e.g., an image of the instructed printed page) that corresponds to the measurement data 222. In this embodiment, this process is performed on the corresponding red, green and blue (RGB) channel for an individual color marking. In other embodiments, additional marks (e.g., locator marks) may be included in the printed print medium 180 to aid locator image processor 1110 in refining the location (e.g., positions) of printhead gaps or markings. In the case of printhead gaps, ideal fiducial mark locations include marks located at pels printed by the first and last nozzle of each individual adjacent printheads so as to identify the location of pels on each side of the printhead gap.

Inaccurate pel forming element spacing location engine 250 also includes map generator 1120 to generate a pel forming element map that maps the cross-web direction 302 positions of the pels of detected marks or print defects in the print image to the corresponding pel forming elements 165 based on the print instructions and the known design of printer 160. In one embodiment, print instructions provide information regarding the pel forming elements 165 that contributed to printing the marks or the locations of printhead gaps, which is then used to generate the map.

Map generator 1120 may also generate a pel forming element map that generally maps image pixel positions (e.g., locations) to additional corresponding pel forming elements 165 by estimating additional image pixel positions in addition to locator mark positions. The map is generated based on the locator mark pixel positions and the print instructions. The map may be further enhanced by generating the map using an estimation model (e.g., a pixel position estimation model) to provide additional image pixel positions in the cross-web direction 302 that are in addition to the locator mark positions in the cross-web direction 302. By generating the map to include the additional cross-web direction 302 image pixel positions, the technical benefit of mapping additional image pixel positions to corresponding pel forming elements is realized.

Map generator 1120 may generate an estimation model using regression (e.g., linear regression) or interpolation (e.g., linear, piecewise, polynomial or spline interpolation) to facilitate generation of the pel forming element map. As a result, estimation is performed with the estimation model based on the positions of the locator marks to determine cross web direction 302 positions of additional pixels of the print image. The objective is to form a map of the set of pel locations for the printhead array which effectively is a piecewise system of adjacent printhead modules. Of particular interest is the region between the pieces/printhead modules where printhead gaps may occur due to inaccurate spacing between the pel forming elements. Within the printhead module the spacing between the pel forming elements is more accurate than between the adjacent pel forming elements from different printheads.

Print element location engine 1130 identifies pel forming element 165 locations associated with the print gap artifact (e.g., gap adjacent pel forming element locations) based on the printhead gap pel locations and the pel forming element map. For example, the determination of the specific pel forming element 165 locations related to the printhead gap pel locations in the scanned image data is determined based on the pel forming element map. Once generated, the gap adjacent pel forming element locations may then be transmitted to compensation selection engine 540.

Figure 12A:
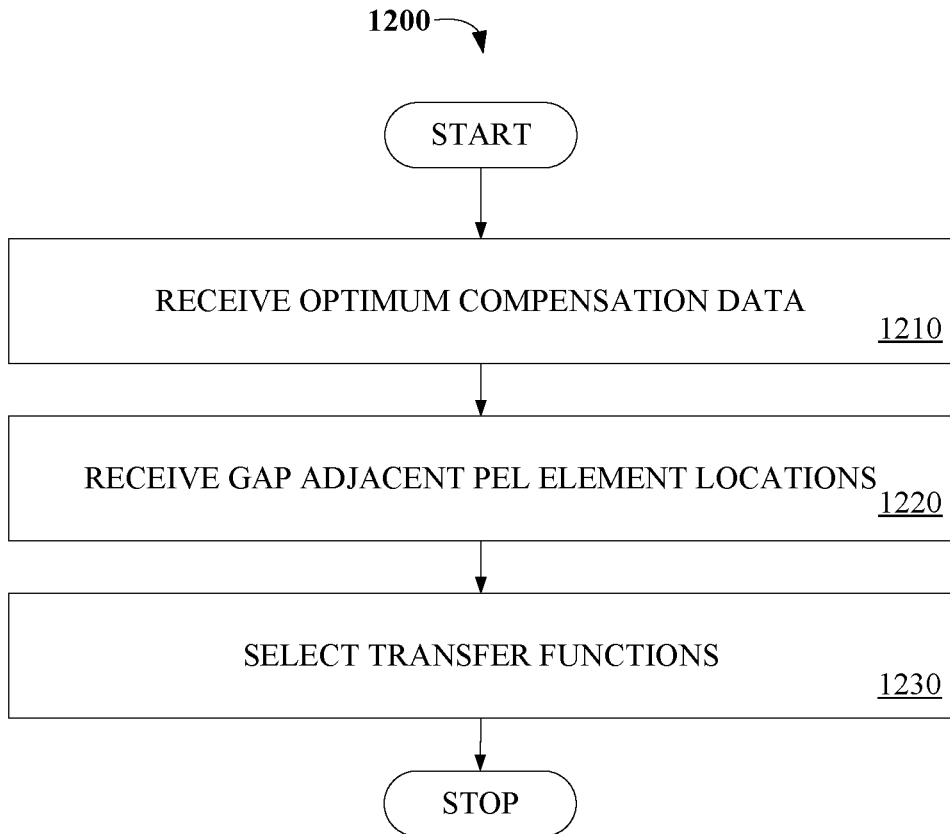
FIGS. 12A and 12B are flow diagrams illustrating embodiments of a process performed by a compensation selection engine.

FIG. 12A is a flow diagram illustrating a process 1200 for performing a compensation selection. Process 1200 may be performed by processing logic that may include hardware (e.g., circuitry, dedicated logic, programmable logic, microcode, etc.), software such as instructions run on a processing device, or a combination thereof. In one embodiment, process 1200 is performed by compensation selection engine 540.

At processing block 1210, optimum compensation data is received from optimum compensation engine 450. At processing block 1220, the gap adjacent pel elements 165 and/or printhead gap locations are received from an inaccurate pel forming element spacing location engine 250. At processing block 1230, transfer functions are selected for each tint level based on the optimum compensation data. However, in embodiments implementing piecewise linear transfer functions, a single continuous transfer function is selected having a plurality of compensation levels associated with each tint level.

Figure 12B:
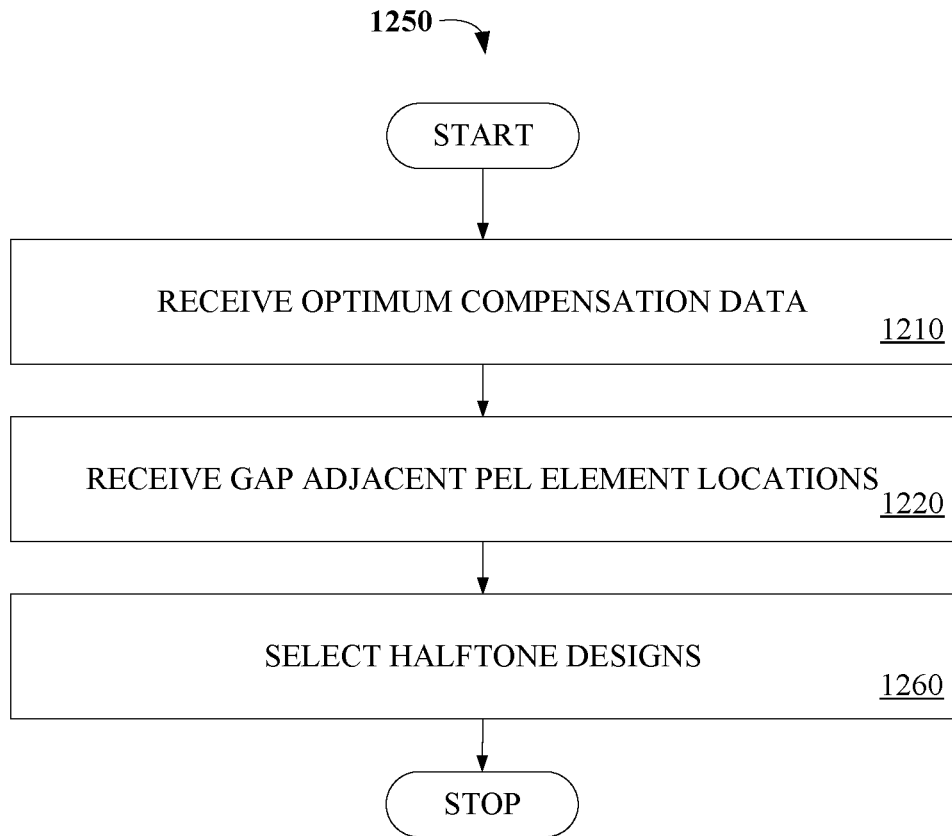

FIG. 12B is a flow diagram illustrating a process 1250 for performing a compensation selection. Process 1250 may be performed by processing logic that may include hardware (e.g., circuitry, dedicated logic, programmable logic, microcode, etc.), software such as instructions run on a processing device, or a combination thereof. In one embodiment, process 1250 is performed by compensation selection engine 540.

At processing block 1210, optimum compensation data is received from optimum compensation engine 450. At processing block 1220, the gap adjacent pel elements 165 and/or printheads 162 gaps locations are received from inaccurate pel forming element spacing location engine 250. At processing block 1260, halftone designs are modified on a column wise basis from the unmodified halftone threshold array (e.g., based on inverse transfer functions for each tint level indicated by the optimum compensation data). However, in embodiments implementing piecewise linear transfer functions, a single halftone design is modified on a column wise basis from the unmodified halftone threshold array generated from a single inverse transfer function having a plurality of compensation levels associated with each tint level. The halftone modification process 1260 obtains replacement thresholds for the columns in the halftone threshold array that require compensation, where the corresponding compensation ITFs are used to generate the replacement thresholds.

Although shown as a component of print controller 140, other embodiments may feature compensation module 216 included within an independent device, or combination of devices, communicably coupled to print controller 140. For instance, FIG. 13 illustrates one embodiment of compensation module 216 implemented in a network 1300.

Figure 13:
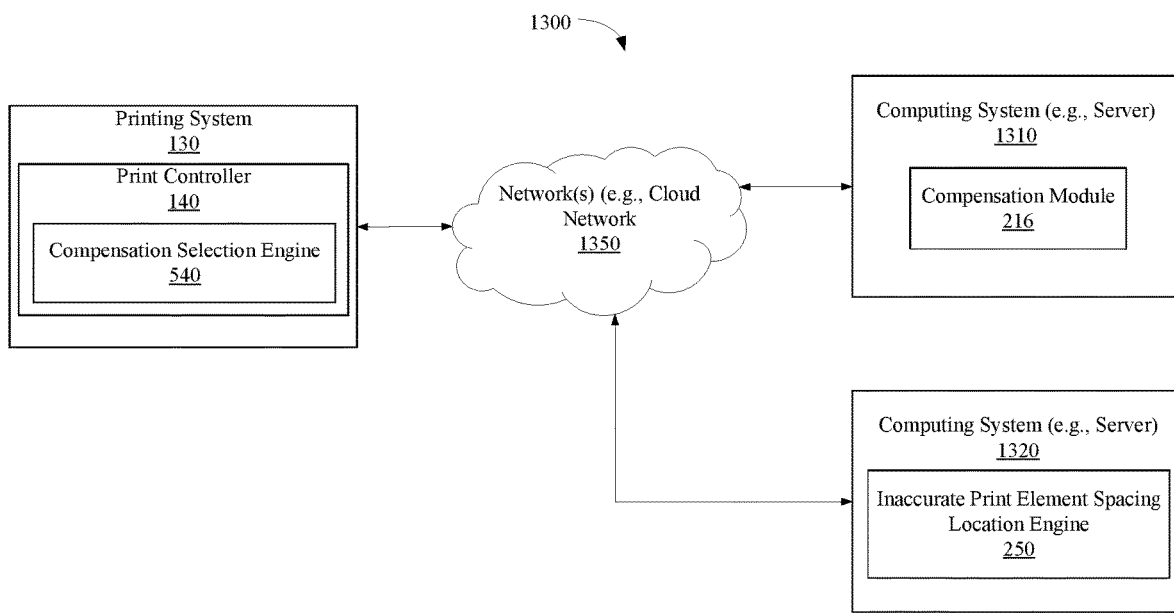
FIG. 13 illustrates one embodiment of a compensation module implemented in a network.

As shown in FIG. 13, compensation module 216 is included within a computing system 1310, inaccurate print element spacing location engine 250 is included within computing system 1320 and compensation selection engine 540 is included within printing system 130. In this embodiment, compensation selection engine 540 may receive transfer functions and/or halftone designs from compensation module 216 at computing system 1310 and gap adjacent pel forming elements 165 locations from inaccurate print element spacing location engine 250 at computing system 1320 via cloud network 1250.

Figure 14A:
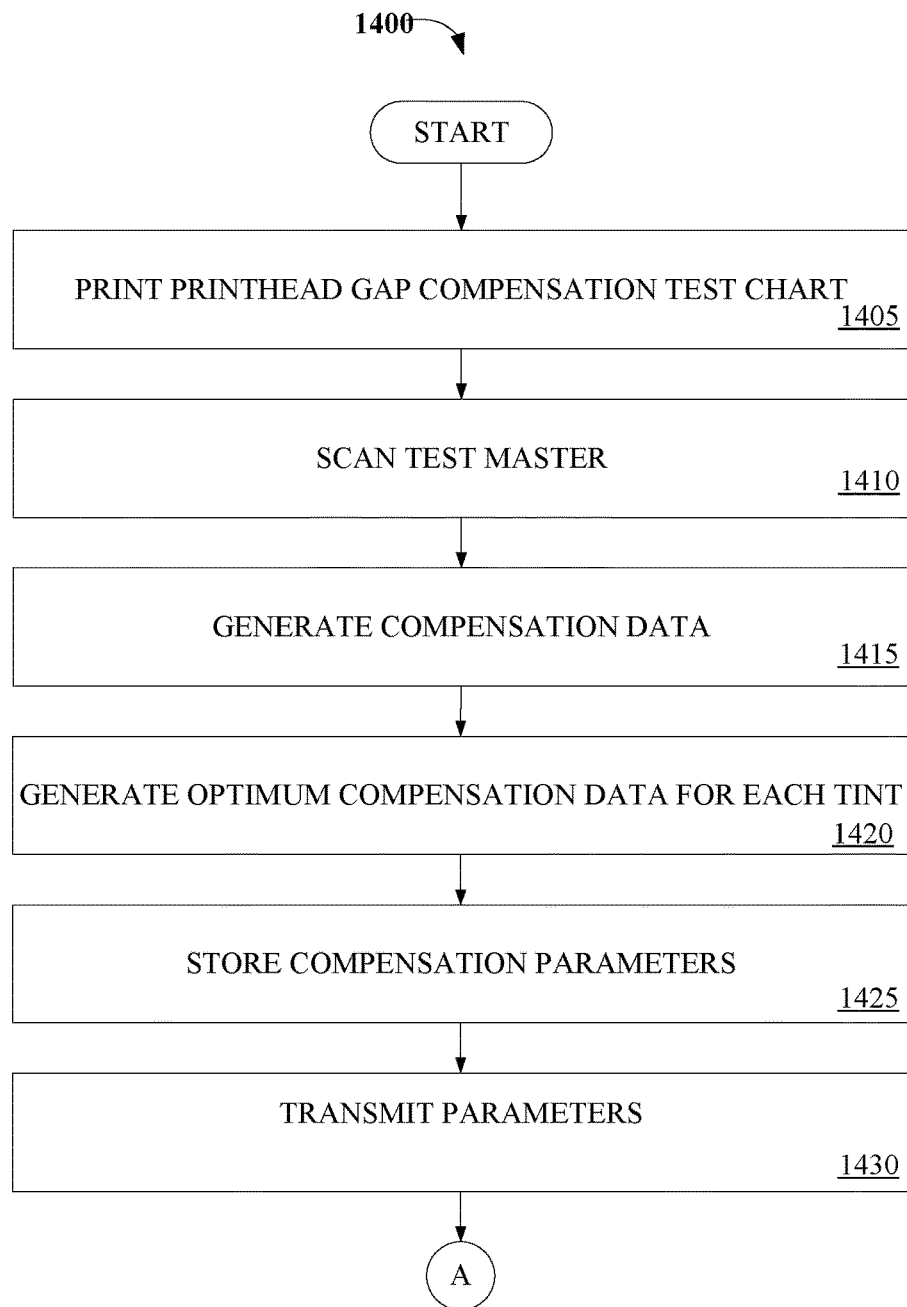
FIGS. 14A and 14B is flow diagram illustrating one embodiment of a process for compensation.
Figure 14B:
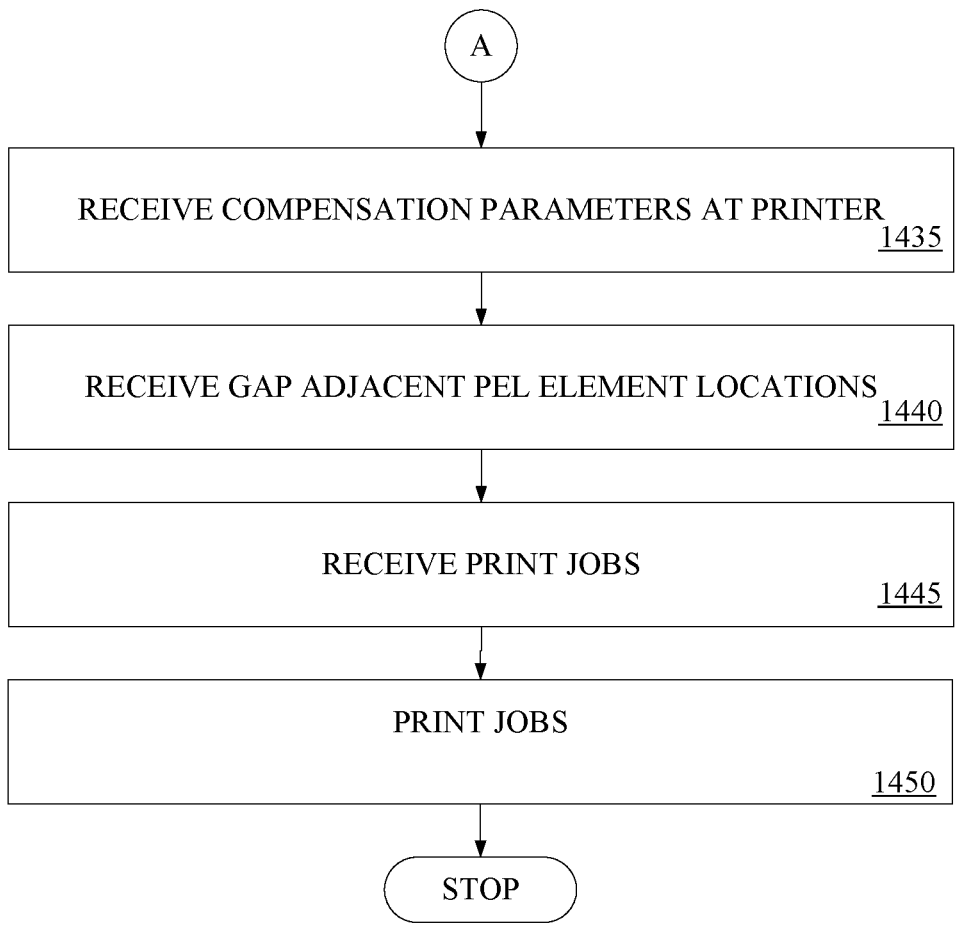

FIGS. 14A and 14B are flow diagrams illustrating one embodiment of process 1400 for compensation. Process 1400 may be performed by processing logic that may include hardware (e.g., circuitry, dedicated logic, programmable logic, microcode, etc.), software such as instructions run on a processing device, or a combination thereof. In one embodiment, process 1400 is performed by printer 160, compensation module 216, inaccurate pel forming element spacing location engine 250 and compensation selection engine 540.

In one embodiment, the processes in FIG. 14A occur offline prior to print production, while the processes in FIG. 14B occur during print production. At processing block 1405 (FIG. 14A), a printhead gap compensation test chart (e.g., print image data) is printed. At processing block 1410, the printed test chart is scanned to generate print image measurement data. At processing block 1415, compensation data (e.g., transfer functions and inverse transfer functions) is generated. At processing block 1420, optimum compensation data is generated for each tint. At processing block 1425, compensation parameters are stored. At processing step 1430, the compensation parameters may be transmitted. In one embodiment, the compensation parameters comprise transfer functions associated with the optimum compensation data, as well as halftone designs generated using the inverse transfer functions.

At processing block 1435 in FIG. 14B, the transmitted compensation parameters (e.g., transfer functions and halftone designs) are received at a printer (e.g., printer 160). At processing block 1440, gap adjacent pel element 165 locations are received (e.g., from inaccurate print element spacing location engine 250). At processing block 1445, print jobs are received. At processing block 1450, the jobs are printed using the compensation parameters.

Figure 15:
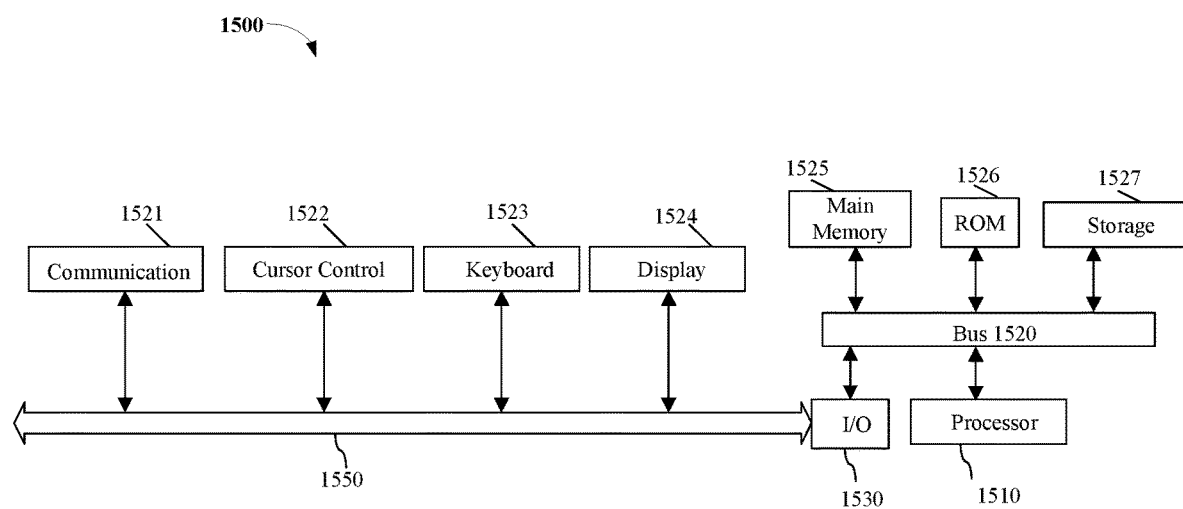
FIG. 15 illustrates one embodiment of a computer system.

FIG. 15 illustrates a computer system 1500 of which printing system 130, print controller 140, inaccurate print element spacing location engine 250, compensation module 216 and/or compensation selection engine 540 may be implemented. Computer system 1500 includes a system bus 1520 for communicating information, and a processor 1510 coupled to bus 1420 for processing information.

Computer system 1500 further comprises a random access memory (RAM) or other dynamic storage device 1525 (referred to herein as main memory), coupled to bus 1520 for storing information and instructions to be executed by processor 1510. Main memory 1525 also may be used for storing temporary variables or other intermediate information during execution of instructions by processor 1510. Computer system 1500 also may include a read only memory (ROM) and or other static storage device 1526 coupled to bus 1520 for storing static information and instructions used by processor 1510.

A data storage device 1527 such as a magnetic disk or optical disc and its corresponding drive may also be coupled to computer system 1500 for storing information and instructions. Computer system 1500 can also be coupled to a second I/O bus 1550 via an I/O interface 1530. A plurality of I/O devices may be coupled to I/O bus 1550, including a display device 1524, an input device (e.g., an alphanumeric input device 1523 and or a cursor control device 1522). The communication device 1521 is for accessing other computers (servers or clients). The communication device 1521 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements, associate measurement data values with the gap adjacent pel forming elements, the applied compensation halftone design and the plurality of tint levels and determine optimal compensation by selecting the compensation halftone design that has corresponding measurement data values closest to compensation target values for each of the plurality of tint levels.

Example 2 includes the subject matter of Example 1, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

Example 3 includes the subject matter of Examples 1 and 2, wherein determining the optimal compensation further comprises determining the compensation target values based on measurement data values corresponding to the baseline regions located on both sides of the adjacent printheads in a cross web direction.

Example 4 includes the subject matter of Examples 1-3, wherein the plurality of tint levels in the measurement data are the same in the cross web direction.

Example 5 includes the subject matter of Examples 1-4, wherein the compensation halftone design in the measurement data is the same in the web movement direction.

Example 6 includes the subject matter of Examples 1-5, wherein the compensation halftone design comprises a halftone threshold array, and wherein the compensation logic further generates the compensation halftone design by modifying an uncompensated halftone threshold array with the first compensation inverse transfer function; and generates the first compensation inverse transfer function, wherein the first compensation inverse transfer function comprises a piecewise linear inverse transfer function comprising a plurality of compensation levels.

Example 7 includes the subject matter of Examples 1-6, wherein each compensation level corresponds to an optimal compensation associated with each of the plurality of tint levels.

Example 8 includes the subject matter of Examples 1-7, further comprising a print engine including the plurality of functioning pel forming elements.

Some embodiments pertain to Example 9 that includes at least one computer readable medium having instructions stored thereon, which when executed by one or more processors, cause the processors to receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements, associate measurement data values with the gap adjacent pel forming elements, the applied compensation halftone design and the plurality of tint levels and determine optimal compensation by selecting the compensation halftone design that has corresponding measurement data values closest to compensation target values for each of the plurality of tint levels.

Example 10 includes the subject matter of Example 9, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

Example 11 includes the subject matter of Examples 9 and 10, wherein determining the optimal compensation further comprises determining the compensation target values based on measurement data values corresponding to the baseline regions located on both sides of the adjacent printheads in a cross web direction.

Example 12 includes the subject matter of Examples 9-11, wherein the plurality of tint levels in the measurement data are the same in the cross web direction.

Example 13 includes the subject matter of Examples 9-12, wherein the compensation halftone design in the measurement data is the same in the web movement direction.

Example 14 includes the subject matter of Examples 9-13, wherein the compensation halftone design comprises a halftone threshold array and wherein the computer readable medium having instructions stored thereon, which when executed by one or more processors, further cause the processors to generate the compensation halftone design by modifying an uncompensated halftone threshold array with the first compensation inverse transfer function; and generate the first compensation inverse transfer function, wherein the first compensation inverse transfer function comprises a piecewise linear inverse transfer function comprising a plurality of compensation levels.

Some embodiments pertain to Example 15 that includes a method comprising receiving measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements, associating measurement data values with the gap adjacent pel forming elements, the applied compensation halftone design and the plurality of tint levels and determining optimal compensation by selecting the compensation halftone design that has corresponding measurement data values closest to compensation target values for each of the plurality of tint levels.

Example 16 includes the subject matter of Example 15, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

Example 17 includes the subject matter of Examples 15 and 16, wherein determining the optimal compensation further comprises determining the compensation target values based on measurement data values corresponding to the baseline regions located on both sides of the adjacent printheads in a cross web direction.

Example 18 includes the subject matter of Examples 15-17, wherein the plurality of tint levels in the measurement data are the same in the cross web direction.

Example 19 includes the subject matter of Examples 15-18, wherein the compensation halftone design in the measurement data is the same in the web movement direction.

Example 20 includes the subject matter of Examples 15-19, wherein the compensation halftone design comprises a halftone threshold array, and further comprises generating the compensation halftone design by modifying an uncompensated halftone threshold array with the first compensation inverse transfer function and generating the first compensation inverse transfer function, wherein the first compensation inverse transfer function comprises a piecewise linear inverse transfer function comprising a plurality of compensation levels.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
   at least one physical memory device to store compensation logic; and
   one or more processors coupled with the at least one physical memory device to execute the compensation logic to:
   receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements;
   associate measurement data values with the gap adjacent pel forming elements, the applied compensation halftone design and the plurality of tint levels; and
   determine optimal compensation by selecting the compensation halftone design that has corresponding measurement data values closest to compensation target values for each of the plurality of tint levels.

2. The system of claim 1, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

3. The system of claim 2, wherein determining the optimal compensation further comprises determining the compensation target values based on the measurement data values corresponding to the baseline regions located on both sides of the adjacent printheads in a cross web direction.

4. The system of claim 1, wherein the plurality of tint levels in the measurement data are the same in a cross web direction.

5. The system of claim 4, wherein the compensation halftone design in the measurement data is the same in a web movement direction.

6. The system of claim 1, wherein the compensation halftone design comprises a halftone threshold array, and wherein the compensation logic further generates the compensation halftone design by modifying an uncompensated halftone threshold array with a first compensation inverse transfer function; and generates the first compensation inverse transfer function, wherein the first compensation inverse transfer function comprises a piecewise linear inverse transfer function comprising a plurality of compensation levels.

7. The system of claim 6, wherein each compensation level corresponds to an optimal compensation associated with each of the plurality of tint levels.

8. The system of claim 1, further comprising a print engine including a plurality of functioning pel forming elements.

9. At least one computer readable medium having instructions stored thereon, which when executed by one or more processors, cause the processors to:
- receive measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements;
- associate measurement data values with the gap adjacent pel forming elements, the applied compensation halftone design and the plurality of tint levels; and determine optimal compensation by selecting the compensation halftone design that has corresponding measurement data values closest to compensation target values for each of the plurality of tint levels.

10. The computer readable medium of claim 9, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

11. The computer readable medium of claim 10, wherein determining the optimal compensation further comprises determining the compensation target values based on the measurement data values corresponding to the baseline regions located on both sides of the adjacent printheads in a cross web direction.

12. The computer readable medium of claim 9, wherein the plurality of tint levels in the measurement data are the same in a cross web direction.

13. The computer readable medium of claim 12, wherein the compensation halftone design in the measurement data is the same in a web movement direction.

14. The computer readable medium of claim 9, wherein the compensation halftone design comprises a halftone threshold array, and wherein the computer readable medium having instructions stored thereon, which when executed by one or more processors, further cause the processors to:
- generate the compensation halftone design by modifying an uncompensated halftone threshold array with the a compensation inverse transfer function; and
- generate the first compensation inverse transfer function, wherein the first compensation inverse transfer function comprises a piecewise linear inverse transfer function comprising a plurality of compensation levels.

15. A method comprising:
receiving measurement data corresponding to a print medium printed with a plurality of pel forming elements in adjacent printheads and a plurality of tint levels, wherein the plurality of pel forming elements comprise gap adjacent pel forming elements that print with applied compensation halftone design and non-gap adjacent pel forming elements;
- associating measurement data values with the gap adjacent pel forming elements, the applied compensation halftone design and the plurality of tint levels; and
- determining optimal compensation by selecting the compensation halftone design that has corresponding measurement data values closest to compensation target values for each of the plurality of tint levels.

16. The method of claim 15, wherein determining the optimal compensation further comprises determining the compensation target values based on measurement data values corresponding to baseline regions, and wherein the baseline regions correspond to one or more of the non-gap adjacent pel forming elements that print without the compensation halftone design applied.

17. The method of claim 16, wherein determining the optimal compensation further comprises determining the compensation target values based on the measurement data values corresponding to the baseline regions located on both sides of the adjacent printheads in a cross web direction.

18. The method of claim 15, wherein the plurality of tint levels in the measurement data are the same in a cross web direction.

19. The method of claim 18, wherein the compensation halftone design in the measurement data is the same in a web movement direction.

20. The method of claim 15, wherein the compensation halftone design comprises a halftone threshold array, and further comprises:
- generating the compensation halftone design by modifying an uncompensated halftone threshold array with a first compensation inverse transfer function; and
- generating the first compensation inverse transfer function, wherein the first compensation inverse transfer function comprises a piecewise linear inverse transfer function comprising a plurality of compensation levels.

* * * * *